(12) United States Patent
Kuramochi et al.

(10) Patent No.: US 11,649,000 B2
(45) Date of Patent: May 16, 2023

(54) SADDLED ELECTRIC VEHICLE

(71) Applicant: HONDA MOTOR CO., LTD., Tokyo (JP)

(72) Inventors: Akira Kuramochi, Wako (JP); Yoshitaka Kobayashi, Wako (JP); Hiroki Ichikawa, Wako (JP); Takafumi Yamaguchi, Wako (JP); Kazuo Tsuji, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 409 days.

(21) Appl. No.: 16/642,036

(22) PCT Filed: Sep. 29, 2017

(86) PCT No.: PCT/JP2017/035434
§ 371 (c)(1),
(2) Date: Feb. 26, 2020

(87) PCT Pub. No.: WO2019/064481
PCT Pub. Date: Apr. 4, 2019

(65) Prior Publication Data
US 2020/0247491 A1    Aug. 6, 2020

(51) Int. Cl.
*B62J 43/20* (2020.01)
*B62J 43/16* (2020.01)
(Continued)

(52) U.S. Cl.
CPC ............... *B62H 5/06* (2013.01); *B62H 5/001* (2013.01); *B62H 5/04* (2013.01); *B62J 9/14* (2020.02);
(Continued)

(58) Field of Classification Search
CPC .. B62H 5/001; B62H 5/04; B62J 43/16; B62J 43/20; B62J 43/30; E05B 83/28
See application file for complete search history.

(56) References Cited

U.S. PATENT DOCUMENTS 7,550,942 B2 * 6/2009 Kurosawa ........... H01M 8/0494
320/101
2004/0231899 A1 * 11/2004 Michisaka ........... F02M 35/162
180/68.1
(Continued)

FOREIGN PATENT DOCUMENTS

CN    102001409    4/2011
CN    102677980    9/2012
(Continued)

OTHER PUBLICATIONS

International Search Report and Written Opinion for International Application No. PCT/JP2017/035434 dated Jan. 9, 2018, 9 pages.
(Continued)

*Primary Examiner* — Hunter B Lonsberry
*Assistant Examiner* — Daniel L Greene
(74) *Attorney, Agent, or Firm* — Amin, Turocy & Watson, LLP

(57) ABSTRACT

A saddled electric vehicle (1) having a battery (100) that is attachable to and detachable from the vehicle (1) includes a vehicle electronic lock (220) which enables the vehicle (1) to be locked and unlocked, a lock control unit (320) which controls the vehicle electronic lock (220), and a sub battery (327) which supplies electric power to the lock control unit (320), in which the lock control unit (320) enables the vehicle to be unlocked in a state in which the battery (100) is removed from the vehicle (1).

6 Claims, 20 Drawing Sheets

(51) Int. Cl.
*B62J 43/30* (2020.01)
*E05B 83/28* (2014.01)
*B62J 9/30* (2020.01)
*B62H 5/06* (2006.01)
*B62H 5/00* (2006.01)
*B62H 5/04* (2006.01)
*B62J 9/14* (2020.01)
*B62J 43/23* (2020.01)

(52) U.S. Cl.
CPC ............... *B62J 9/30* (2020.02); *B62J 43/16* (2020.02); *B62J 43/20* (2020.02); *B62J 43/23* (2020.02); *B62J 43/30* (2020.02); *E05B 83/28* (2013.01)

(56) References Cited

U.S. PATENT DOCUMENTS

| | | | | |
|---|---|---|---|---|
| 2005/0099264 A1* | 5/2005 | Konno | ............... | B62H 5/00 340/5.64 |
| 2013/0231810 A1* | 9/2013 | Garcia | ............... | B62M 6/45 701/22 |
| 2018/0178754 A1* | 6/2018 | Yamamoto | ............ | B60R 25/24 |

| | | | |
|---|---|---|---|
| 2020/0130771 A1* | 4/2020 | Jacobsz Rosier | ........ B62J 45/20 |

FOREIGN PATENT DOCUMENTS

| | | |
|---|---|---|
| CN | 106639661 | 5/2017 |
| EP | 2778032 | 9/2014 |
| JP | 04-331648 | 11/1992 |
| JP | 2001-233262 | 8/2001 |
| JP | 2009-161093 | 7/2009 |
| JP | 2012-101702 | 5/2012 |
| JP | 2013-043462 | 3/2013 |
| JP | 2013-208949 | 10/2013 |
| JP | 2013-248971 | 12/2013 |
| JP | 2015-519252 | 7/2015 |
| WO | 2013/016559 | 1/2013 |
| WO | 2013/179208 | 12/2013 |

OTHER PUBLICATIONS

Extended European Search Report for European Patent Application No. 17927622.5 dated Jul. 20, 2020, 8 pages.
Chinese Office Action for Chinese Patent Application No. 201780095313.1 dated Dec. 28, 2020, 14 pages.

* cited by examiner

SADDLED ELECTRIC VEHICLE

TECHNICAL FIELD

The present invention relates to a saddled electric vehicle.

BACKGROUND ART

For example, Patent Literature 1 discloses a saddled electric vehicle in which a battery for supplying electric power to a drive source is detachably provided.

CITATION LIST

Patent Literature

Patent Literature 1
Japanese Unexamined Patent Application, First Publication No. 2013-208949

SUMMARY OF INVENTION

Technical Problem

Incidentally, in a case of a saddled electric vehicle, there are cases in which the vehicle is moved to a desired location during a state in which the vehicle is not generating a driving force (for example, a neutral state in an engine vehicle).

On the other hand, there are vehicles having a vehicle electronic lock such as smart systems. In such a vehicle, even while the vehicle remains locked due to a vehicle electronic lock in a state in which a battery is removed from the vehicle, the vehicle is required to be easily movable.

An aspect of the present invention is to provide a saddled electric vehicle in which the vehicle can be easily moved even while the vehicle remains locked due to a vehicle electronic lock in a state in which a battery is removed from the vehicle.

Solution to Problem

One aspect of the present invention is a saddled electric vehicle (1) having a battery (100) that is attachable to and detachable from the vehicle (1) including a vehicle electronic lock (220) which enables the vehicle (1) to be locked and unlocked, a lock control unit (320) which controls the vehicle electronic lock (220), and a sub battery (327) which supplies electric power to the lock control unit (320), in which the lock control unit (320) enables the vehicle (1) to be unlocked in a state in which the battery (100) is removed from the vehicle (1).

According to this configuration, since the lock control unit enables the vehicle to be unlocked in a state in which the battery is removed from the vehicle, the lock of the vehicle can be released. Therefore, even while the vehicle remains locked due to the vehicle electronic lock in a state in which the battery is removed from the vehicle, the vehicle can be easily moved.

In one aspect of the present invention, the vehicle electronic lock (220) may enable the vehicle (1) to be locked and unlocked by authentication with a portable device (223), and the lock control unit (320) may control the vehicle electronic lock (220) on the basis of an authentication result with the portable device (223).

According to this configuration, even while the vehicle remains locked due to the vehicle electronic lock in a state in which the battery is removed from the vehicle, the vehicle can be easily moved using the portable device.

One aspect of the present invention may further include a direct current-direct current converter (DC-DC converter) (326) which connects the battery (100) and the sub battery (327), in which the sub battery (327) may be charged via the DC-DC converter (326) while the vehicle is traveling.

According to this configuration, since the sub battery is charged while the vehicle is traveling, the vehicle electronic lock can be prevented from becoming inoperable due to reduction in power of the sub battery.

In one aspect of the present invention, the vehicle electronic lock (220) may include a handle lock part (211) which enables a handle (2) to be locked and unlocked.

According to this configuration, even while the handle remains locked due to the vehicle electronic lock in a state in which the battery is removed from the vehicle, since the lock of the handle can be released by the handle lock part, the vehicle can be easily moved.

In one aspect of the present invention, the handle lock part (211) may be disposed in a vicinity of a head pipe (12).

According to this configuration, since the handle lock part can be easily accessed compared to a case in which the handle lock part is disposed far away from the head pipe, the lock of the handle can be easily released.

One aspect of the present invention may further include a lock pin (214) which is manually operable, in which an engaging part (202d) that engages with the lock pin (214) in a locked state of the handle (2) may be provided in the head pipe (12).

According to this configuration, since the engagement between the lock pin and the engaging part can be manually released, the lock of the handle can be easily released.

In one aspect of the present invention, the vehicle electronic lock (220) may include a lid lock part (212) which enables a storage lid (8) that stores the battery (100) to be locked and unlocked.

According to this configuration, even while the storage lid remains locked due to the vehicle electronic lock in a state in which the battery is removed from the vehicle, since the lock of the storage lid can be released by the lid lock part, the battery can be easily stored.

Advantageous Effects of Invention

According to the present invention, even while the vehicle remains locked due to the vehicle electronic lock in a state in which the battery is removed from the vehicle, the vehicle can be easily moved.

BRIEF DESCRIPTION OF DRAWINGS

FIG. 18(a) is a view illustrating a stored state of the charging cord according to the embodiment. FIG. 18(b) is a view illustrating a first method of drawing out the charging cord according to the embodiment. FIG. 18(c) is a view illustrating a second method of drawing out the charging cord according to the embodiment.

DESCRIPTION OF EMBODIMENTS

Figure 1:
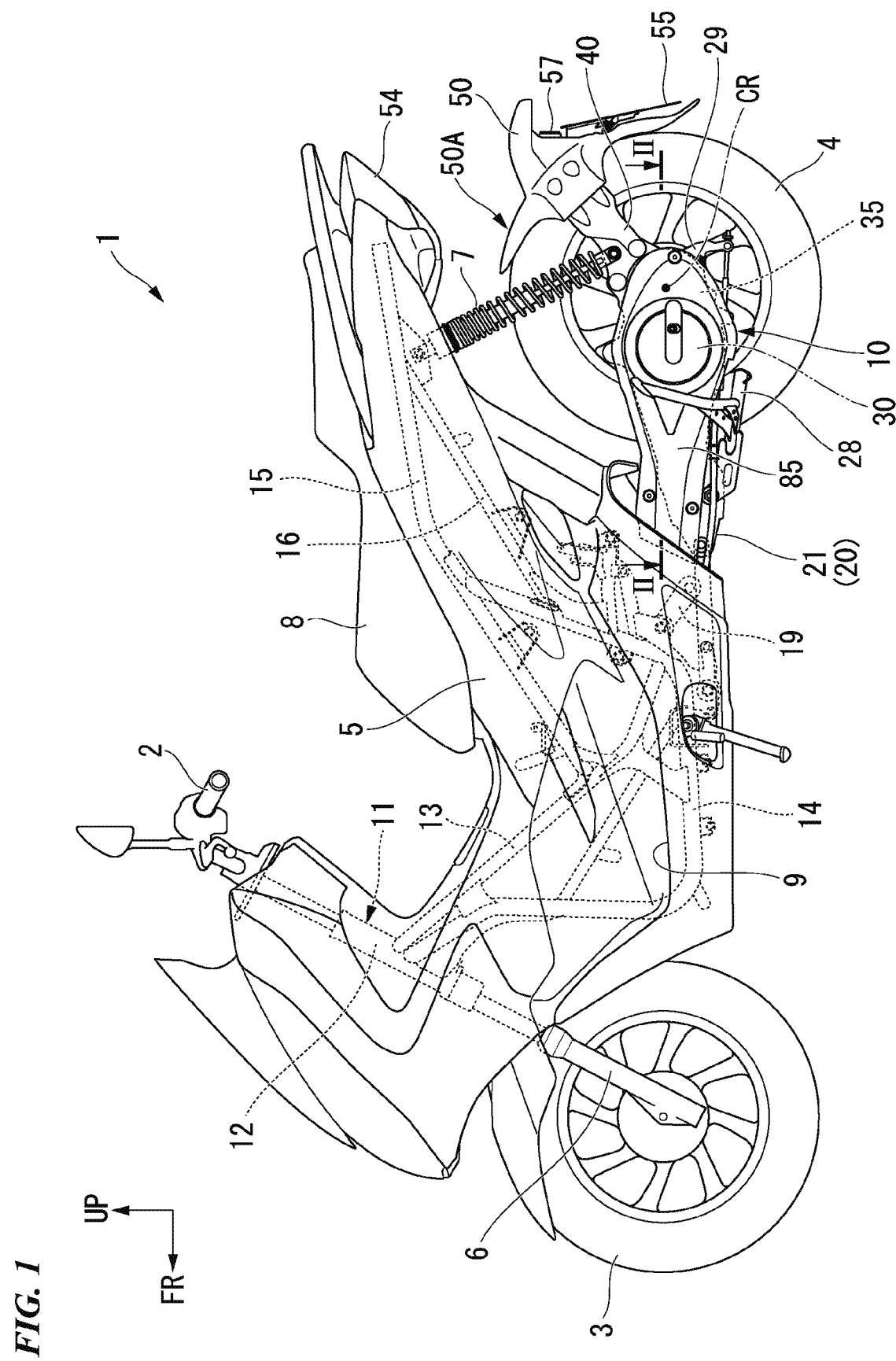
FIG. 1 is a left side view of a motorcycle according to an embodiment.

Hereinafter, embodiments of the present invention will be described with reference to the drawings. In the following description, directions such as forward, rearward, left, and right are the same as directions in a vehicle to be described below unless otherwise specified. An arrow FR indicating toward the front of the vehicle, an arrow LH indicating toward the left of the vehicle, an arrow UP indicating toward the top of the vehicle, and a line CL indicating a vehicle body left-right center are illustrated at suitable positions in the drawings used for the following description.

<Entire Vehicle>

FIG. 1 illustrates a motorcycle 1 of a unit swing type as an example of a saddled electric vehicle. Referring to FIG. 1, the motorcycle 1 includes a front wheel 3 steered by a handle 2, and a rear wheel 4 driven by a power unit 10 including a power source. Hereinafter, the motorcycle may be simply referred to as a "vehicle" in some cases. The motorcycle 1 of the embodiment is a vehicle of a scooter type having step floors 9 on which a rider seated on a seat 8 places his/her feet.

Components of a steering system including the handle 2 and the front wheel 3 are pivotably supported by a head pipe 12 of a front end of a vehicle body frame 11 to be steerable. An outer circumference of the vehicle body frame 11 is covered with a vehicle body cover 5. In FIG. 1, reference sign 6 denotes a front fork.

The vehicle body frame 11 is formed by integrally joining steel pieces of a plurality of types by welding or the like. The vehicle body frame 11 includes the head pipe 12 positioned at a front end portion thereof, a pair of left and right upper frames 13 extending obliquely rearward and downward from the head pipe 12, a pair of left and right down frames 14 extending obliquely rearward and downward from a lower portion of the head pipe 12 with a steeper inclination than the left and right upper frames 13, then extending rearward substantially horizontally from lower ends thereof, and then extending obliquely rearward and upward from rear ends thereof, a pair of left and right rear upper frames 15 extending obliquely rearward and upward from vertically intermediate portions of the left and right upper frames 13 to be connected to rear upper ends of the left and right down frames 14 and extending obliquely rearward and upward from connecting parts thereof, and rear lower frames 16 extending obliquely rearward and upward from rear portions of the down frames 14 and connected to rear portions of the rear upper frames 15.

<Power Unit>

The power unit 10 is a power unit of a swing type in which a motor 30 serving as a drive source disposed on a left side of the rear wheel 4, a power transmission mechanism 35 capable of driving the rear wheel 4 with power obtained from the motor 30, and the swing frame 20 supporting the motor 30 and the power transmission mechanism 35 are integrated.

An axle 4a of the rear wheel 4 (hereinafter also referred to as a "rear wheel axle 4a," see FIG. 2) is provided at a rear end portion of the power unit 10. When power obtained from the motor 30 is transmitted to the rear wheel axle 4a (see FIG. 2) via the power transmission mechanism 35, the rear wheel 4 supported by the rear wheel axle 4a is driven and the vehicle travels. Reference sign CR in the drawing denotes a central axis (rear wheel axis) of the rear wheel axle 4a, which is an axis parallel to a vehicle width direction.

A front lower portion of the power unit 10 is supported by a lower rear side of the vehicle body frame 11 via a link mechanism 19 to be vertically swingable. A pair of left and right rear cushions 7 that attenuate swing of the power unit 10 stretch between a rear end of the power unit 10 and the seat frames 15. Hereinafter, in the vehicle, constituents on the left side in the vehicle width direction may be denoted by adding "L," and constituents on the right side in the vehicle width direction may be denoted by adding "R."

<Swing Frame>

Figure 2:
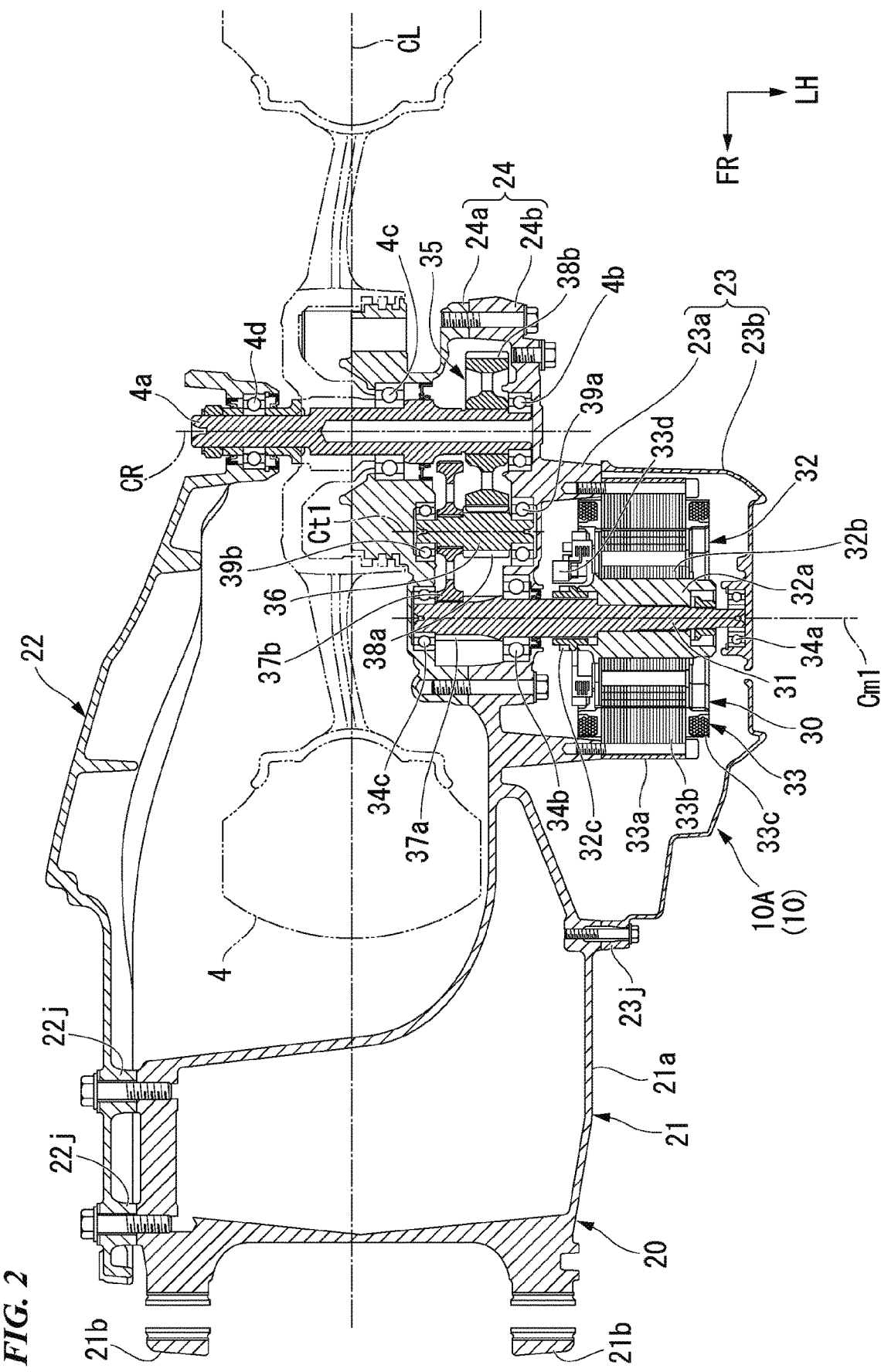
FIG. 2 is a view including a cross section along line II-II of FIG. 1.

As illustrated in FIG. 2, the swing frame 20 includes a main arm 21 extending from the front of the rear wheel 4 toward the left side of the rear wheel 4, and a sub arm 22 extending from a front right portion of the main arm 21 toward a right side of the rear wheel 4 while curving inward in the vehicle width direction.

<Main Arm>

A power housing part 23 that houses the motor 30 and a transmission housing part 24 that houses the power transmission mechanism 35 are provided in the main arm 21.

<Power Housing Part>

The power housing part 23 includes an inner cover 23a that covers the motor 30 from an inward side in the vehicle width direction, and an outer cover 23b that covers the motor 30 from an outward side in the vehicle width direction.

The inner cover 23a has a box shape that opens outward in the vehicle width direction. The inner cover 23a is integrally formed with an arm part 21a of the main arm 21 as the same member.

The outer cover 23b has a box shape that opens inward in the vehicle width direction. The outer cover 23b is coupled to the inner cover 23a using a fastening member such as a bolt.

<Arm Part>

Figure 3:
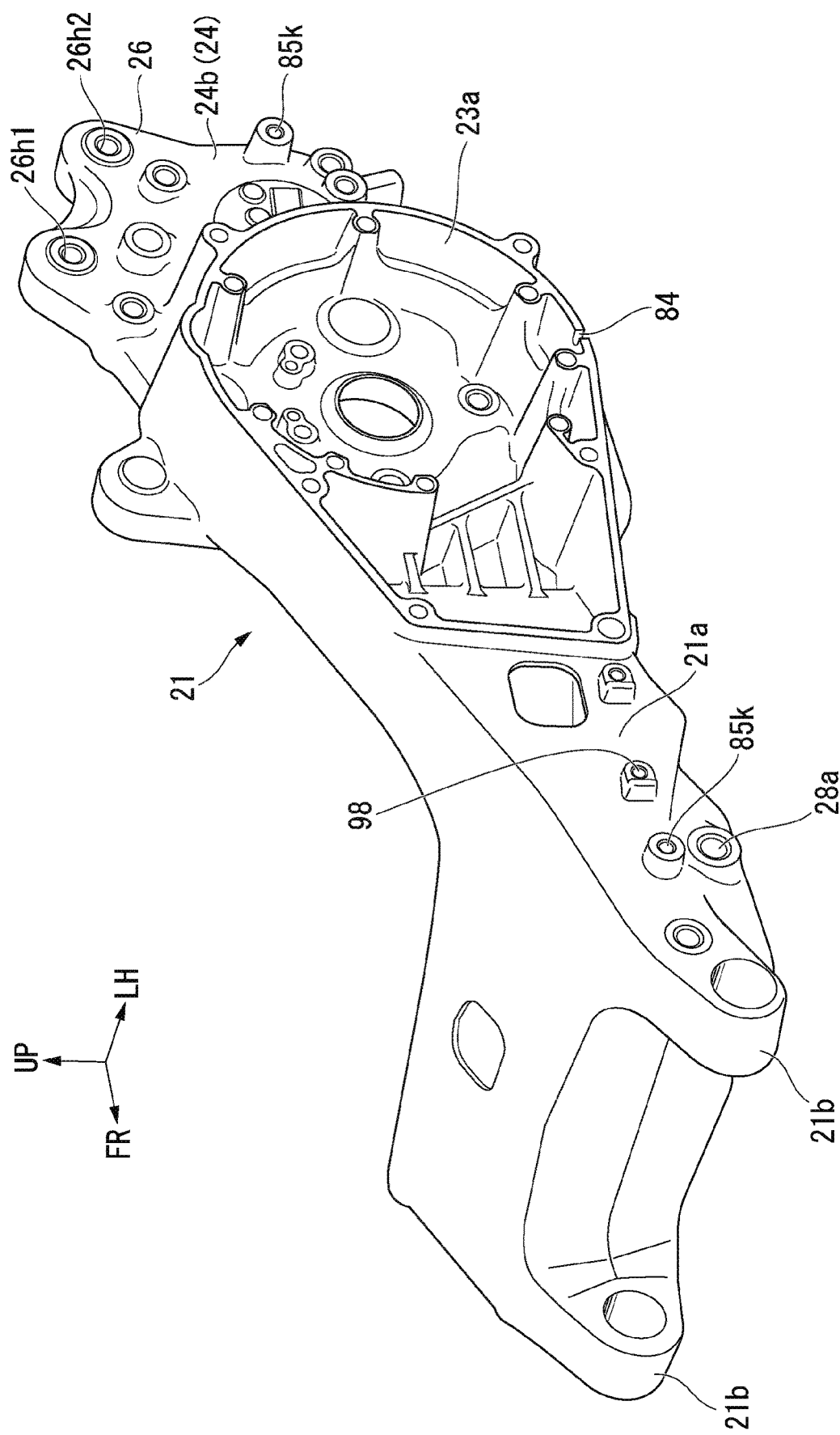
FIG. 3 is a perspective view of a main arm according to the embodiment when viewed from above and from the left.

As illustrated in FIG. 2, an arm part 21a that extends to the front from the power housing part 23 is provided in the main arm 21. As illustrated in FIG. 3, the arm part 21a extends in a front-rear direction to be continuous with the inner cover 23a. In FIG. 3, reference sign 21b denotes a pair of left and right front extension part that extends to the front from a front end portion of the arm part 21a.

<Transmission Housing Part>

As illustrated in FIG. 2, the transmission housing part 24 includes an inner case 24a disposed on an inward side in the vehicle width direction on the left side of the rear wheel 4, and an outer case 24b that covers the inner case 24a from an outward side in the vehicle width direction.

The inner case 24a has a box shape that opens outward in the vehicle width direction.

The outer case 24b has a box shape that opens inward in the vehicle width direction. The outer case 24b is integrally formed with the inner cover 23a of the main arm 21 as the same member. The outer case 24b is coupled to the inner case 24a using a fastening member such as a bolt.

Figure 4:
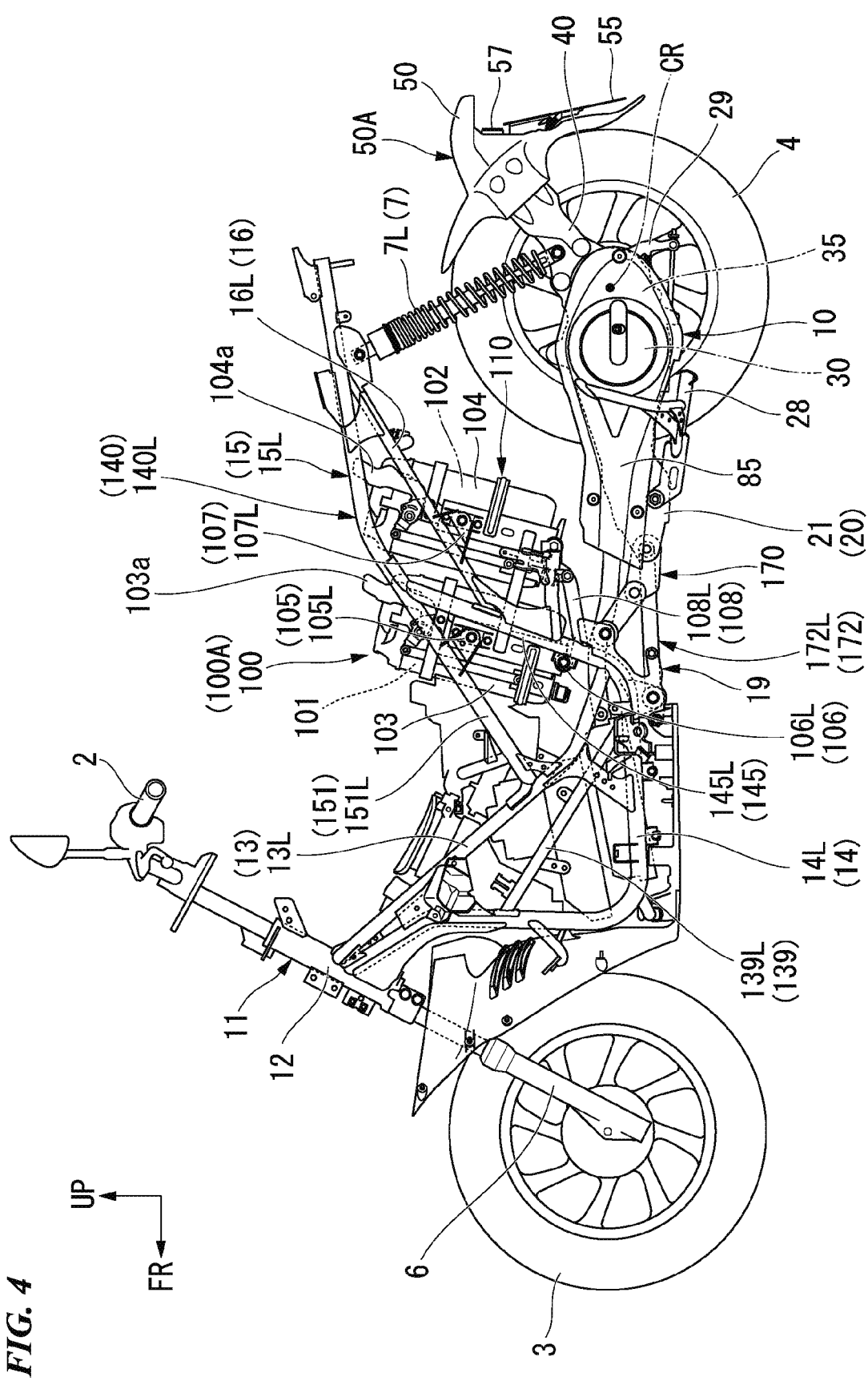
FIG. 4 is a view in which a vehicle body cover or the like is removed from FIG. 1.

As illustrated in FIG. 3, a fender stay support part 26 that protrudes rearward and upward to support a fender stay 40 (see FIG. 4) is provided in the transmission housing part 24. As illustrated in FIG. 4, the fender stay 40 extends rearward and upward from a vicinity of the rear wheel axle 4a (see FIG. 2) to support a fender 50 disposed on a rear upper side of the rear wheel. In FIG. 4, reference sign 28 denotes a center stand (hereinafter also simply referred to as a "stand"), and reference sign 29 denotes a rear brake. In FIG. 3, reference sign 28a denotes a stand engaging part with which the stand is rotatably engaged.

<Motor>

As illustrated in FIG. 2, the motor 30 is disposed on the left side of the rear wheel 4. The motor 30 is an electric motor. The motor 30 is a motor of an inner rotor type. The motor 30 includes a motor output shaft 31, an inner rotor 32, and a stator 33.

The motor output shaft 31 is directed in the vehicle width direction and is rotatably supported by the main arm 21. The motor output shaft 31 has an axis Cm1 (hereinafter also referred to as a "motor axis Cm1") parallel to a rear wheel axis CR. Reference signs 34a to 34c in the drawing denote bearings which rotatably support the motor output shaft 31.

The inner rotor 32 includes an inner rotor main body 32a having a cylindrical shape, and a magnet 32b provided on an outer circumferential surface of the inner rotor main body 32a. A central portion in a radial direction of the inner rotor main body 32a is spline-coupled to the motor output shaft 31. An object to be detected 32c is attached to an outer circumferential surface of an inner end portion in the vehicle width direction of the inner rotor main body 32a.

The stator 33 includes an annular stator yoke 33a fixed to an outer circumferential wall of the inner cover 23a, a plurality of teeth 33b joined to the stator yoke 33a and provided radially with respect to the motor axis Cm1, and a coil 33c in which a conductive wire is wound around the teeth 33b. A rotor sensor 33d which detects the object to be detected 32c is attached to the stator yoke 33a.

A battery 100 (see FIG. 4) is connected to the motor 30. The battery 100 supplies electric power to the motor 30 when the motor 30 drives the rear wheel 4.

<Power Transmission Mechanism>

As illustrated in FIG. 2, the power transmission mechanism 35 is disposed on the left side of the rear wheel 4. The power transmission mechanism 35 is provided in the transmission housing part 24 that is continuous with the power housing part 23.

The power transmission mechanism 35 includes a transmission shaft 36 rotatably supported in parallel with the motor output shaft 31 and the rear wheel axle 4a, first gear pair 37a and 37b provided at an inner end portion in the vehicle width direction of the motor output shaft 31 and at an inner portion in the vehicle width direction of the transmission shaft 36, and second gear pair 38a and 38b provided at an outer portion in the vehicle width direction of the transmission shaft 36 and at a left end portion of the rear wheel axle 4a. Reference signs 4b to 4d in the drawing denote bearings which rotatably support the rear wheel axle 4a.

The motor output shaft 31, the transmission shaft 36, and the rear wheel axle 4a are disposed in this order at intervals in the front-rear direction from the front. The transmission shaft 36 has an axis Ct1 (hereinafter also referred to as a "transmission axis Ct1") parallel to the motor axis Cm1. Reference signs 39a and 39b in the drawing denote bearings which rotatably support the transmission shaft 36.

With this configuration, rotation of the motor output shaft 31 is decelerated at a predetermined speed reduction ratio and then is transmitted to the rear wheel axle 4a.

<Sub Arm>

As illustrated in FIG. 2, the sub arm 22 extends in the front-rear direction on the right side of the rear wheel 4. A front end portion of the sub arm 22 is coupled to a right portion of a front portion of the main arm 21 using a fastening member such as a bolt. In FIG. 2, reference sign 22j indicates a connecting part of the sub arm 22 with the main arm 21. Although not illustrated, a right cushion support stay protruding rearward and upward to support the right rear cushion is provided in a rear end portion of the sub arm 22.

<Fender Structure>

As illustrated in FIG. 1, a fender structure 50A which supports the fender 50 disposed on a rear upper side of the rear wheel 4 with the fender stay 40 extending toward the rear of the vehicle from the vicinity of the rear wheel axle 4a (see FIG. 2) is provided on a rear side of the vehicle. The fender structure 50A has a cantilever structure in which only a left portion of the fender 50 is fixed to the fender stay 40. In FIG. 1, reference sign 85 denotes a protective cover that covers the power housing part 23 from an outward side in the vehicle width direction, and reference sign 54 denotes a tail lamp.

In FIG. 3, reference signs 26h1 and 26h2 denote a plurality of through holes that open in the vehicle width direction so that shaft portions of bolts can be inserted therethrough, reference sign 85k denotes a connecting part with the protective cover 85 (see FIG. 1) in the main arm 21 or the like, reference sign 98 denotes a female screw part provided in the arm part 21a.

<Battery>

As illustrated in FIG. 4, the battery 100 that supplies electric power to the motor 30 is mounted below the seat 8 (see FIG. 1). The battery 100 is constituted by two unit batteries 101 and 102 in the front-rear direction. The unit batteries 101 and 102 have the same configuration as each other. The unit batteries 101 and 102 each have a prismatic shape (rectangular parallelepiped shape) extending in a longitudinal direction with a rectangular cross section (for example, square shape). The unit batteries 101 and 102 are each disposed such that front and rear sides of the cross-sectional shape extend in the vehicle width direction and left and right sides thereof extend in the front-rear direction. The front and rear unit batteries 101 and 102 are inclined parallel to each other and are disposed with an interval between front and rear surfaces facing each other.

The battery 100 generates a predetermined high voltage (for example, 48 V to 72 V) due to the plurality of unit batteries 101 and 102 being connected in series. For example, the unit batteries 101 and 102 may be each configured by a lithium ion battery as energy storage that is chargeable and dischargeable. The unit batteries 101 and 102 are inserted into and removed from battery cases 103 and 104 fixed to the vehicle body (case support structure 110) from above. As illustrated in FIG. 4, the case support structure 110 supporting the battery cases 103 and 104 is attached to the vehicle body frame 11.

Although not illustrated, battery insertion/removal ports that open upward are provided in the battery cases 103 and 104. As illustrated in FIG. 4, lock mechanisms 103a and 104a which restrict upward separation of the front and rear batteries 101 and 102 that have been inserted into the respective cases are provided around the respective battery insertion/removal ports. The unit batteries 101 and 102 are obliquely slid into the battery cases 103 and 104 from the battery insertion/removal ports and are stored in the battery cases 103 and 104 so that they can be taken in and out. The unit batteries 101 and 102 are obliquely inserted and removed with respect to the battery cases 103 and 104, and thereby some of a weight of the unit batteries 101 and 102 is supported by wall parts of the battery cases 103 and 104.

Hereinafter, on a side below the seat 8 (see FIG. 1), the unit battery 101 positioned on a front side is also referred to as "front battery 101," and the unit battery 102 positioned on a rear side is also referred to as "rear battery 102." Hereinafter, the battery case 103 accommodating the front battery 101 is also referred to as "front case 103," and the battery case 104 accommodating the rear battery 102 is also referred to as "rear case 104."

Battery-side connection terminals (not illustrated) are provided at lower end portions of the front and rear batteries 101 and 102. Case-side connection terminals (not illustrated) for detachably connecting the battery-side connection terminals are provided on bottom wall parts of the front and rear battery cases 103 and 104. Before locking operations of the lock mechanisms 103a and 104a, the case-side connection terminals are embedded on a lower side of the bottom wall parts of the front and rear battery cases 103 and 104. At this time, although the front and rear batteries 101 and 102 can be inserted into and removed from the battery cases 103 and 104, the battery-side connection terminals and the case-side connection terminals are not connected merely by inserting the front and rear batteries 101 and 102 into the battery cases 103 and 104.

When the lock mechanisms 103a and 104a are operated to be locked after the front and rear batteries 101 and 102 are stored in the front and rear battery cases 103 and 104, the case-side connection terminals protrude to upper sides of the bottom wall parts of the front and rear battery cases 103 and 104. Thereby, the battery-side connection terminals and the case-side connection terminals are connected. The locking operation and terminal connection can be performed for each of the front and rear batteries 101 and 102.

The operation of the lock mechanisms 103a and 104a and the insertion and removal of the front and rear batteries 101 and 102 are manually performed, and the front and rear batteries 101 and 102 are attached to and detached from the vehicle body without tools. The front and rear batteries 101 and 102 are attachable to and detachable from the vehicle body with the seat 8 (see FIG. 1) open. The front and rear batteries 101 and 102 cannot be attached to or detached from the vehicle body with the seat 8 (see FIG. 1) closed. When the seat 8 (see FIG. 1) is opened and closed, the front and rear batteries 101 and 102 are switched between a state of being attachable and detachable and a state of not being attachable and detachable with respect to the vehicle body.

The front and rear batteries 101 and 102 are mobile batteries that can be attached to and detached from the vehicle body. The front and rear batteries 101 and 102 can be charged by a charger outside the vehicle or can be used as a power supply for an external device as a mobile battery. The front and rear batteries 101 and 102 can be used singly.

Figure 5:
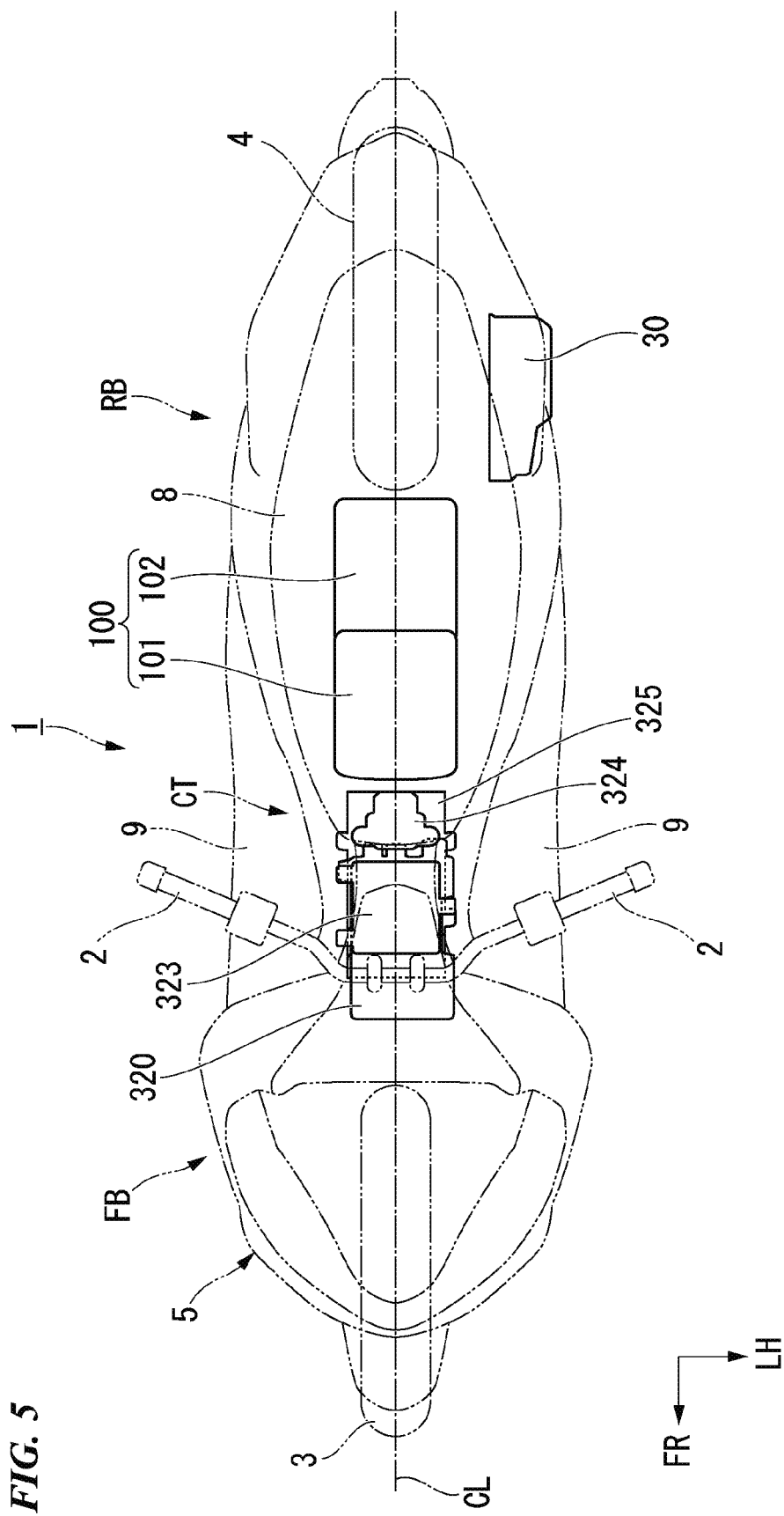
FIG. 5 is a top view illustrating a disposition of components in the vehicle body according to the embodiment.

As illustrated in FIG. 5, the battery 100 is disposed in front of the motor 30 in a vehicle front-rear direction. In the top view of FIG. 5, the battery 100 is disposed at a position other than the motor 30. In the top view of FIG. 5, the front and rear batteries 101 and 102 are disposed across the vehicle body left-right center line CL from the left and to the right. In the top view of FIG. 5, a center in the vehicle width direction of the front and rear batteries 101 and 102 coincides with the vehicle body left-right center line CL.

<Center Tunnel or the Like>

As illustrated in FIG. 5, the motorcycle 1 includes a pair of left and right step floors 9 on which a driver seated on the seat 8 places his/her feet, a center tunnel CT extending in the vehicle front-rear direction between the left and right step floors 9, a front body FB which is continuous with the front of the center tunnel CT and the left and right step floors 9, and a rear body RB which is continuous with the rear of the center tunnel CT and the left and right step floors 9.

Figure 6:
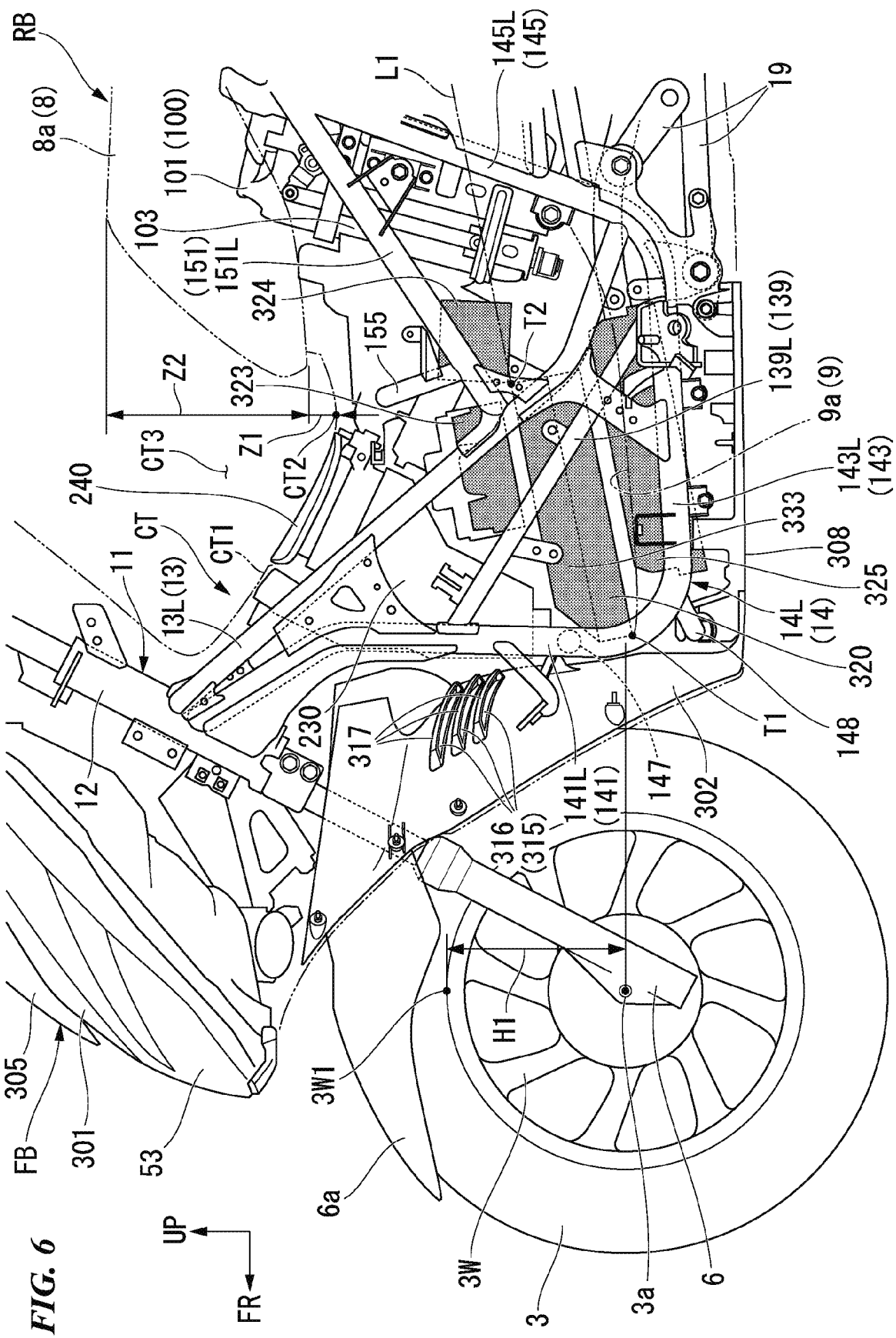
FIG. 6 is a left side view illustrating a disposition of components in a center tunnel according to the embodiment.

The center tunnel CT is provided in front of a front end of the seat 8 and below the handle 2. The center tunnel CT bulges upward with respect to the step floors 9. As illustrated in FIG. 6, the center tunnel CT extends such that an upper surface portion CT1 is inclined downward toward the rear behind the front body FB. The center tunnel CT is connected to the rear body RB with a rear side of the upper surface portion CT1 curved upward. Hereinafter, a curved lower end portion on the rear side of the upper surface portion CT1 of the center tunnel CT is referred to as a lowest portion CT2.

The lowest portion CT2 is positioned on a side above an upper end of the front wheel 3. The lowest portion CT2 is disposed in the vicinity of a lower end portion of the seat 8 (front seat 8a). In a side view, a distance z1 in a vertical direction between the lowest portion CT2 and the lower end portion of the front seat 8a is smaller than a thickness z2 in a vertical direction of the front seat 8a. A distance from floor surfaces 9a to the lowest portion CT2 is larger than a distance from the lowest portion CT2 to an upper surface of the front seat 8a.

When the motorcycle 1 is configured such that the center tunnel CT is provided on the step floors 9, the center tunnel CT can be sandwiched between the left and right feet of a rider while giving a degree of freedom to rider's footrest positions. Therefore, comfort around the rider's feet and controllability of the vehicle body are secured. The center tunnel CT constitutes a low floor part of the motorcycle 1. A straddling space CT3 that allows the rider to easily straddle the vehicle body is formed above the center tunnel CT.

A lower side of a front end portion of the seat 8 is connected to the vehicle body via a hinge shaft extending in the vehicle width direction (left-right direction). The seat 8 vertically rotates with the hinge shaft as a center to open and close an upper portion of the rear body RB. When the seat 8 is in a closed state (see FIG. 1) in which the upper portion of the rear body RB is closed, the rider can be seated on the seat 8. When the seat 8 is in an open state in which the upper portion of the rear body RB is open, an article or space below the seat 8 can be accessed. The seat 8 can be locked in the closed state.

In FIG. 6, reference sign 6a denotes a front fender, reference sign 53 denotes a front combination lamp, reference sign 301 denotes a front cover that covers an upper portion of the front body FB from the front above the front combination lamp 53, reference sign 302 denotes a concave-shaped front lower cover that covers a lower portion of the front body FB from the front below the front combination lamp 53 and behind the front wheel 3, reference sign 305 denotes a wind screen attached to an upper portion of the front cover 301 to overlap therewith from the front, and reference sign 308 denotes an undercover that covers a lower surface of the vehicle body from below.

An airflow guide hole 315 that guides a traveling wind into the center tunnel CT is provided in the front lower cover 302. The airflow guide hole 315 has a plurality of openings 316. Hoods 317 that change a flow of the traveling wind having passed through the openings 316 downward are formed on a back side (rear side) of the front lower cover 302.

In FIG. 6, reference sign 320 denotes a power control unit (PCU) serving as a control unit (control unit), reference sign 323 denotes a junction box, reference sign 324 denotes a contactor, reference sign 325 denotes a charger, and reference sign 333 denotes a heat-dissipation fin.

In the side view of FIG. 6, the PCU 320 is disposed in a height range H1 between an axial center of a front wheel axle 3a and an upper end 3w1 of a wheel 3w in the vertical direction. The PCU 320 is disposed to be inclined downward toward the front in a side view. A front lower end (lowermost end) T1 of the PCU 320 is positioned at substantially the same height as the front wheel axle 3a. A rear upper end (uppermost end) T2 of the PCU 320 is positioned below the upper end 3w1 of the wheel 3w of the front wheel 3.

In the side view of FIG. 6, an extension line L1 in which an upper end edge of the heat-dissipation fin 333 is extended toward the rear of the vehicle overlaps the battery 100.

<Vehicle Body Frame Details>

Figure 7:
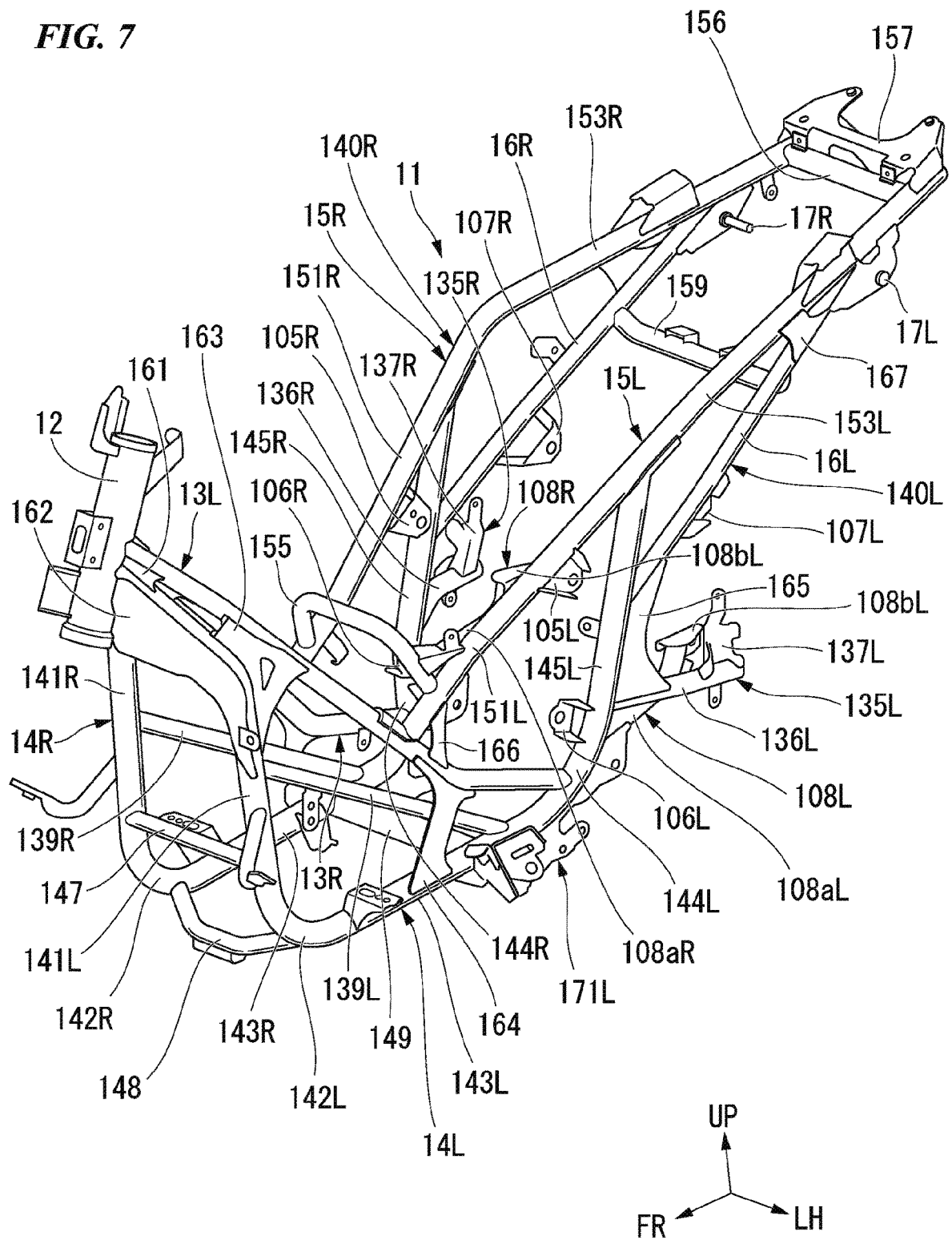
FIG. 7 is a perspective view of a vehicle body frame according to the embodiment when viewed from above and from the left.

As illustrated in FIG. 7, the vehicle body frame 11 includes the head pipe 12 positioned at a front end portion and extending vertically, a pair of left and right upper frames 13L and 13R extending rearward and downward from a vertically intermediate portion of the head pipe 12, a pair of left and right down frames 14L and 14R extending downward from the lower portion of the head pipe 12, then extending rearward, and then extending rearward and upward, a pair of left and right middle frames 139L and 139R extending to be inclined such that they are positioned further downward toward the rear vertically between the left and right upper frames 13L and 13R and the left and right down frames 14L and 14R, a pair of left and right rear upper frames 15L and 15R (second rear frames) extending rearward and upward from front-rear intermediate portions of the left and right upper frames 13L and 13R, and a pair of left and right rear lower frames 16L and 16R (third rear frames) extending to be inclined such that they are positioned further upward toward the rear below the left and right rear upper frames 15L and 15R.

For example, the respective constituents of the vehicle body frame 11 may be formed of round steel pipes. The term "intermediate" used in the present embodiment is meant to include not only a center between opposite ends of an object but also an inner range between opposite ends of the object.

The down frame 14 and the rear upper frame 15 are formed of round steel pipes having substantially the same diameter as each other. The upper frame 13, the middle frame 139, and the rear lower frame 16 are formed of round steel pipes having a slightly smaller diameter than the down frame 14 (the rear upper frame 15).

In FIG. 7, reference sign 17L denotes a left cushion upper shaft support part which rotatably supports an upper end portion of a left rear cushion 7L (see FIG. 4), and reference sign 18R denotes a right cushion upper shaft support part which rotatably supports an upper end portion of a right rear cushion (not illustrated).

<Head Pipe>

Figure 8:
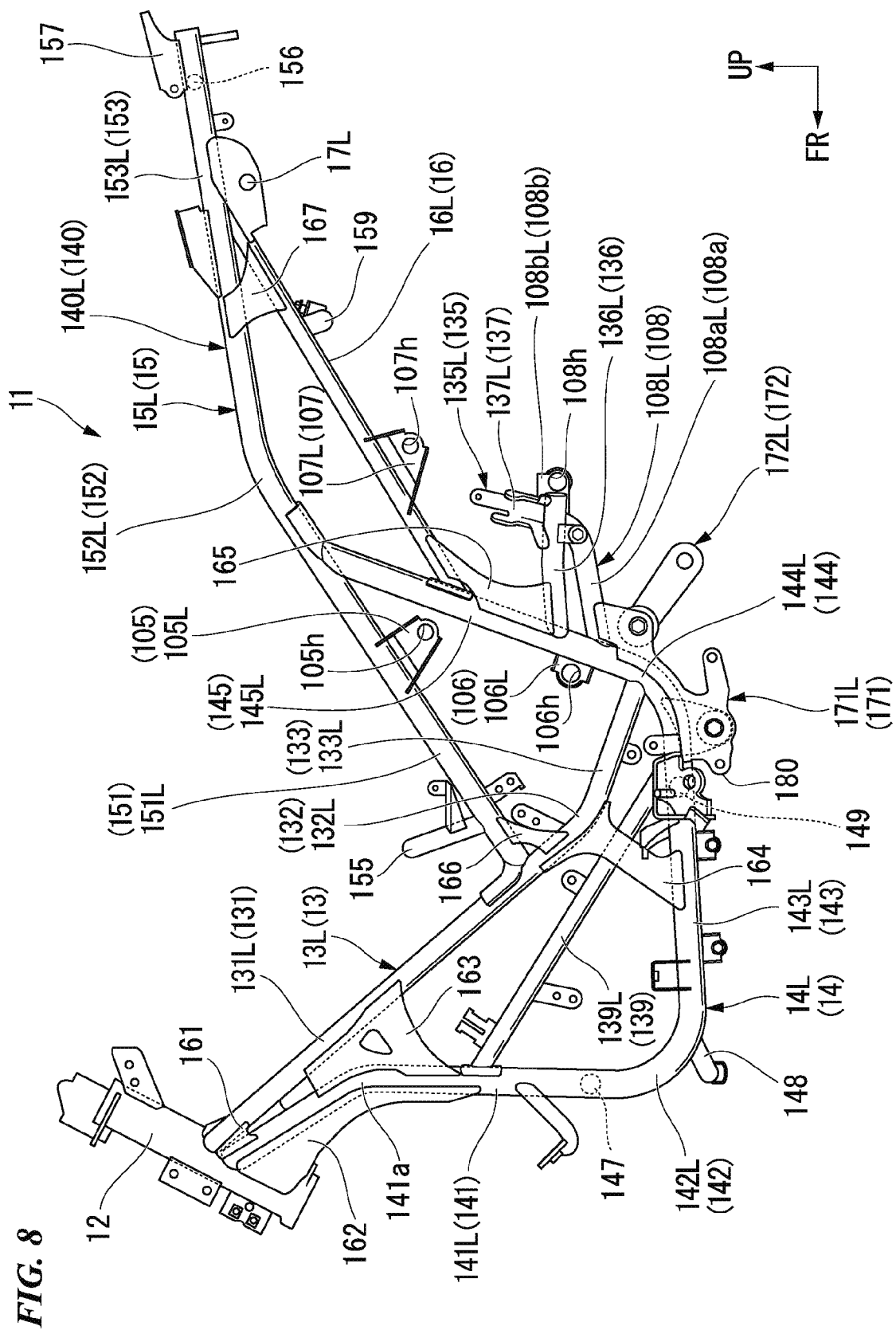
FIG. 8 is a left side view of the vehicle body frame according to the embodiment.

In the side view of FIG. 8, the head pipe 12 extends to be inclined such that it is positioned further toward the rear toward the upper side. Various brackets for attaching constituents of a vehicle front portion is provided in the head pipe 12.

<Upper Frame>

In the side view of FIG. 8, the upper frame 13 includes an upper frame front-half part 131 linearly extending rearward and downward from the vertically intermediate portion of the head pipe 12, a front lower curved part 132 continuous with a lower end of the upper frame front-half part 131 and having a curved shape that is convex forward and downward, and an upper frame rear-half part 133 continuous with a rear end of the front lower curved part 132 and linearly extending rearward and downward with more gentle inclination than the upper frame front-half part 131. The upper frame front-half part 131, the front lower curved part 132, and the upper frame rear-half part 133 are integrally formed of a round steel pipe. A rear lower end of the upper frame rear-half part 133 is connected to a rear lower bent part 144 of the down frame 14 from a front upper side.

Figure 9:
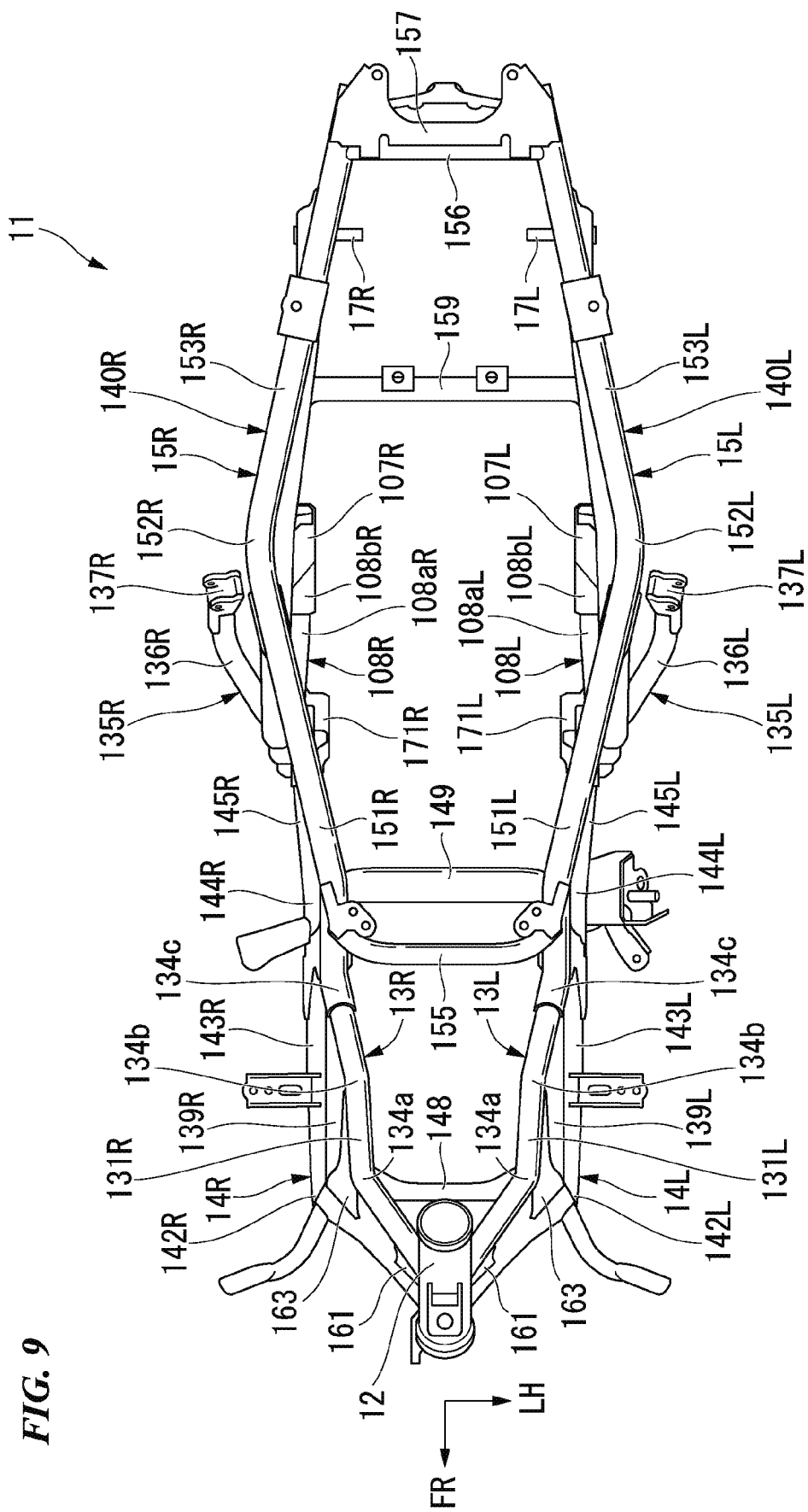
FIG. 9 is a top view of the vehicle body frame according to the embodiment.

In the top view of FIG. 9, the left and right upper frames 13L and 13R are positioned on an inward side in the vehicle width direction of the left and right down frames 14L and 14R. In the top view of FIG. 9, the left and right upper frames 13L and 13R extend obliquely from the vertically intermediate portion of the head pipe 12 such that they are positioned further outward in the vehicle width direction toward the rear while being bent at a plurality of positions.

In the top view of FIG. 9, the left and right upper frames 13L and 13R are inclined to be positioned further outward in the vehicle width direction toward the rear from the vertically intermediate portion of the head pipe 12 and then bent at first bent parts 134a to extend substantially parallel to side surfaces of the vehicle body. In the top view of FIG. 9, the left and right upper frames 13L and 13R are bent at the first bent parts 134a, extend substantially parallel to the side surfaces of the vehicle body, and then are bent at second bent parts 134b to extend to be inclined such that they are positioned further outward in the vehicle width direction toward the rear. In the top view of FIG. 9, the left and right upper frames 13L and 13R are bent at the second bent parts 134b, extend to be inclined such that they are positioned further outward in the vehicle width direction toward the rear, and then are bent at third bent parts 134c to extend substantially parallel to the side surfaces of the vehicle body.

<Down Frame>

In the side view of FIG. 8, the down frame 14 has a U shape. In the side view of FIG. 8, the down frame 14 includes a front down frame part 141 extending downward from a lower part of the head pipe 12, a front lower bent part 142 continuous with a lower end of the front down frame part 141 and having a curved shape that is convex forward and downward, a lower frame part 143 continues with a rear end of the front lower bent part 142 and extending rearward, the rear lower bent part 144 continuous with a rear end of the lower frame part 143 and having a curved shape that is convex rearward and downward, and a rear frame part 145 (first rear frame) continuous with an upper end of the rear lower bent part 144 and extending rearward and upward. The front down frame part 141, the front lower bent part 142, the lower frame part 143, the rear lower bent part 144, and the rear frame part 145 are integrally formed of a round steel pipe. Rear frame parts 145L and 145R as a pair of left and right first rear frames, the rear upper frames 15L and 15R as a pair of left and right second rear frames, and the rear lower frames 16L and 16R as a pair of left and right third rear frames constitute a pair of left and right rear frames 140L and 140R disposed on a rear portion of the vehicle (see FIG. 7).

In the top view of FIG. 9, the left and right down frames 14L and 14R obliquely extend from the lower portion of the head pipe 12 such that they are positioned further outward in the vehicle width direction toward the rear, are bent at the front lower bent parts 142, extend substantially parallel to the side surfaces of the vehicle body until reaching the rear lower bent parts 144, and then are bent at the rear lower bent parts 144 to extend to be inclined such that they are positioned further outward in the vehicle width direction toward the rear.

As illustrated in FIG. 8, a front upper bent part 141a having a curved shape that is convex rearward and upward is provided in the front down frame part 141. In the side view of FIG. 8, the front down frame part 141 extends rearward and downward from the lower portion of the head pipe 12, then is bent at the front upper bent part 141a, and extends substantially vertically downward.

As illustrated in FIG. 7, a front middle stage cross frame 147 that stretches in the vehicle width direction between left and right front down frame parts 141L and 141R is provided between lower portions of the left and right front down frame parts 141L and 141R. The front middle stage cross frame 147 extends in a straight line in the vehicle width direction. Opposite ends of the front middle stage cross frame 147 are connected to the left and right front down frame parts 141L and 141R from inward sides in the vehicle width direction. The front middle stage cross frame 147 is formed of a round steel pipe having a smaller diameter than the down frame 14.

As illustrated in FIG. 7, a front lower cross frame 148 that stretches in the vehicle width direction between left and right front lower bent parts 142L and 142R is provided between the left and right front lower bent parts 142L and 142R. The front lower cross frame 148 extends in the vehicle width direction in a curved shape that is convex forward and downward. Opposite ends of the front lower cross frame 148 are connected to the left and right front lower bent parts 142L and 142R from inward sides in the vehicle width direction. The front lower cross frame 148 is formed of a round steel pipe having a smaller diameter than the down frame 14.

In the side view of FIG. 8, the lower frame part 143 extends substantially in the vehicle front-rear direction. As illustrated in FIG. 7, a lower cross frame 149 that stretches in the vehicle width direction between left and right lower frames 143L and 143R is provided between the left and right lower frame parts 143L and 143R. The lower cross frame 149 extends in a straight line in the vehicle width direction. Opposite ends of the lower cross frame 149 are connected to the left and right lower frame parts 143L and 143R from inward sides in the vehicle width direction. The lower cross frame 149 is formed of a round steel pipe having substantially the same diameter as the down frame 14.

In the top view of FIG. 9, left and right rear lower bent parts 144L and 144R are inclined such that they are positioned further outward in the vehicle width direction as they are positioned further upward.

In the top view of FIG. 9, lower portions of the left and right rear frame parts 145L and 145R are inclined such that they are positioned further outward in the vehicle width direction as they are positioned further upward in accordance with an inclination of the rear lower bent parts 144L and 144R. The left and right rear frame parts 145L and 145R are gently curved inward in the vehicle width direction above lower portions thereof and extend substantially parallel to the side surfaces of the vehicle body.

As illustrated in FIG. 7, a pair of left and right step support stays 135L and 135R which support a pillion step (not illustrated) are provided on the lower portions of the left and right rear frame parts 145L and 145R. The left and right step support stays 135L and 135R include step support stay main bodies 136L and 136R extending rearward from the lower portions of the rear frame parts 145L and 145R, and step support parts 137L and 137R extending upward from rear end portions of the step support stay main bodies 136L and 136R.

In the side view of FIG. 8, the step support stay main bodies 136 extend in the front-rear direction. In the top view of FIG. 9, the left and right step support stay main bodies 136L and 136R extend to be curved such that they are positioned further outward in the vehicle width direction toward the rear. As illustrated in FIG. 8, front ends of the step support stay main bodies 136 are connected to lower portions of the left and right rear frame parts 145 from the rear. The step support stay main body 136 is formed of a round steel pipe having a smaller diameter than the down frame 14.

<Middle Frame>

In the side view of FIG. 8, the middle frame 139 linearly extends rearward and downward. A front upper end of the middle frame 139 is connected to a vertically intermediate portion of the front down frame part 141 from the rear. A rear lower end of the middle frame 139 is connected to a rear portion of the lower frame part 143 from above.

In the plan view of FIG. 9, the left and right middle frames 139L and 139R are disposed to be positioned between the left and right upper frames 13L and 13R and the left and right lower frame parts 143L and 143R. In the plan view of FIG. 9, the left and right middle frames 139L and 139R extend substantially parallel to the side surfaces of the vehicle body.

<Rear Upper Frame>

In the side view of FIG. 8, the rear upper frame 15 includes a rear upper front-half part 151 (front extension part) which linearly extends forward and downward from an upper end portion of the rear frame part 145, an intermediate curved part 152 continuous with a rear end of the rear upper front-half part 151 and having a curved shape that is convex forward and upward, and a rear upper rear-half part 153 continuous with a rear end of the intermediate curved part 152 and linearly extending rearward and upward with more gentle inclination than the rear upper front-half part 151. The rear upper front-half part 151, the intermediate curved part 152, and the rear upper rear-half part 153 are integrally formed of a round steel pipe. A front lower end of the rear upper front-half part 151 is connected to the upper frame front-half part 131 from a rear upper side.

In the top view of FIG. 9, left and right upper frame front-half portions 131L and 131R extend to be inclined such that they are positioned further outward in the vehicle width direction toward the rear between connecting parts with a center cross frame 155 and intermediate curved parts 152L and 152R. In the top view of FIG. 9, left and right rear upper rear-half parts 153L and 153R extend to be inclined such that they are positioned further inward in the vehicle width direction toward the rear between the intermediate curved parts 152L and 152R and rear ends thereof.

As illustrated in FIG. 7, the center cross frame 155 that stretches in the vehicle width direction between left and right rear upper front-half parts 151L and 151R is provided between front end portions of the left and right rear upper front-half parts 151L and 151R. The center cross frame 155 extends in the vehicle width direction in a curved shape that is convex forward and upward. In other words, the center cross frame 155 has a U shape (inverted U shape) that opens rearward and downward. Opposite ends of the center cross frame 155 are connected to the front end portions of the left and right rear upper front-half parts 151L and 151R from a front upper side. The center cross frame 155 is formed of a round steel pipe having a smaller diameter than the rear upper frame 15.

A rear end cross frame 156 and a rear end cross plate 157 that stretch in the vehicle width direction between the left and right rear upper rear-half parts 153L and 153R are provided between rear end portions of the left and right rear upper rear-half parts 153L and 153R.

The rear end cross frame 156 extends in a straight line in the vehicle width direction. Opposite ends of the rear end cross frame 156 are connected to the rear end portions of the left and right rear upper rear-half parts 153L and 153R from inward sides in the vehicle width direction. The rear end cross frame 156 is formed of a round steel pipe having substantially the same diameter as the rear upper frame 15.

The rear end cross plate 157 extends in the vehicle width direction to have a U shape that opens rearward. Opposite ends of the rear end cross plate 157 are connected to the rear end portions of the left and right rear upper rear-half parts 153L and 153R from above.

<Rear Lower Frame>

In the side view of FIG. 8, the rear lower frame 16 extends substantially parallel to the rear upper front-half part 151. A front end of the rear lower frame 16 is connected to a vertically intermediate portion of the rear frame part 145 from the rear. A rear end of the rear lower frame 16 is connected to a front-rear intermediate portion of the rear upper rear-half part 153 from below.

As illustrated in FIG. 7, a rear lower cross frame 159 that stretches in the vehicle width direction between the left and right rear lower frames 16L and 16R is provided between the left and right rear lower frames 16L and 16R. The rear lower cross frame 159 extends in the vehicle width direction in a curved shape that is convex downward. Opposite ends of the rear lower cross frame 159 are connected to front-rear intermediate portions of the left and right rear lower frames 16L and 16R from inward sides in the vehicle width direction. The rear lower cross frame 159 is formed of a round steel pipe having substantially the same diameter as the rear lower frame 16.

<Gusset>

As illustrated in FIG. 8, gussets of various types for reinforcing respective constituents of the vehicle body frame 11 are provided in the vehicle body frame 11.

An intermediate gusset 161 that connects a front upper end portion of the upper frame 13 and a front upper end portion of the down frame 14 is provided at the vertically intermediate portion of the head pipe 12.

A front gusset 162 for reinforcing a front upper portion of the down frame 14 is provided at the lower portion of the head pipe 12.

An upper gusset 163 for reinforcing the upper frame 13 and the down frame 14 is provided between the upper frame front-half part 131 and the front down frame part 141.

A lower gusset 164 for reinforcing the upper frame 13 and the down frame 14 is provided between the front lower curved part 132 and the lower frame part 143.

A side gusset 165 that connect a front end portion of the rear lower frame 16 and a front end portion of the step support stay 135 is provided at the vertically intermediate portion of the rear frame part 145.

A middle gusset 166 for reinforcing the rear upper frame 15 and the upper frame 13 is provided between the rear upper front-half part 151 and the upper frame front-half part 131.

A rear gusset 167 for reinforcing the rear lower frame 16 and the rear upper frame 15 is provided between the rear lower frame 16 and the rear upper rear-half part 153.

<Battery Disposition Structure>

As illustrated in FIG. 4, a battery disposition structure 100A including the pair of left and right rear frames 140L and 140R and the rear battery 102 disposed between the left and right rear frames 140L and 140R is provided on the rear portion of the vehicle.

The battery disposition structure 100A further includes the rear battery 102 disposed behind the front case 103 in which the front battery 101 is stored, the pair of left and right rear upper frames 15L and 15R, and the pair of left and right rear lower frames 16L and 16R, a pair of left and right first upper brackets 105L and 105R protruding rearward and downward from rear portions of the left and right rear upper front-half parts 151L and 151R, a pair of left and right first lower brackets 106L and 106R protruding forward and upward from the lower portions of the left and right rear frame parts 145L and 145R, a pair of left and right second upper brackets 107L and 107R protruding rearward and downward from front portions of the left and right rear lower frames 16, a pair of left and right battery support parts 108L and 108R extending rearward from the lower portions of the left and right rear frame parts 145L and 145R, and a power unit support structure 170 extending rearward from lower rear portions of the left and right down frames 14L and 14R to support the power unit 10 to be swingable.

<First Upper Bracket>

As illustrated in FIG. 7, the left and right first upper brackets 105L and 105R are connected to the rear portions of the left and right rear upper front-half parts 151L and 151R from below. As illustrated in FIG. 8, a through hole 105$h$ (hereinafter referred to as a "first upper through hole 105$h$") that opens in the vehicle width direction so that a shaft portion of a bolt can be inserted therethrough is provided in the first upper bracket 105.

<First Lower Bracket>

As illustrated in FIG. 7, the left and right first lower brackets 106L and 106R are connected to the left and right rear frame parts 145L and 145R from the front. The left and right first lower brackets 106L and 106R are respectively disposed on a side opposite to the left and right battery support parts 108L and 108R with the left and right rear frame parts 145L and 145R sandwiched therebetween. As illustrated in FIG. 8, a through hole 106$h$ (hereinafter referred to as a "first lower through hole 106$h$") that opens in the vehicle width direction so that a shaft portion of a bolt can be inserted therethrough is provided in the first lower bracket 106.

<Second Upper Bracket>

As illustrated in FIG. 7, the left and right second upper brackets 107L and 107R are connected to front portions of the left and right rear lower frames 16L and 16R from below. As illustrated in FIG. 8, a through hole 107h (hereinafter referred to as a "second upper through hole 107h") that opens in the vehicle width direction so that a shaft portion of a bolt can be inserted therethrough is provided in the second upper bracket 107.

<Battery Support Part>

As illustrated in FIG. 7, the left and right battery support parts 108L and 108R include left and right battery support stay main bodies 108aL and 108aR extending rearward from the lower portions of the left and right rear frame parts 145L and 145R, and second lower brackets 108bL and 108bR extending rearward from rear end portions of the battery support stay main bodies 108aL and 108aR.

In the side view of FIG. 8, the battery support stay 108 extends to be gently inclined such that it is positioned further upward toward the rear. In the top view of FIG. 9, the left and right battery support stays 108L and 108R extend to be inclined such that they are positioned further inward in the vehicle width direction toward the rear. In the top view of FIG. 9, the left and right battery support stays 108L and 108R are positioned on an inward side in the vehicle width direction of the left and right step support stays 135L and 135R.

As illustrated in FIG. 8, a front end of the battery support stay main body 108a is connected to the lower portion of the rear frame part 145 from the rear. The battery support stay main body 108a is formed of a round steel pipe having a smaller diameter than the down frame 14.

A through hole 108h (hereinafter referred to as a "second lower through hole 108h") that opens in the vehicle width direction so that a shaft portion of a bolt can be inserted therethrough is provided in the second lower bracket 108b.

For example, bolts are respectively inserted from an outward side in the vehicle width direction into the first upper through hole 105h, the first lower through hole 106h, the second upper through hole 107h, and the second lower through hole 108h (see FIG. 8), and shaft portions of the bolts are caused to protrude therefrom. Then, the case support structure 110 can be fixed to each of the brackets 105, 106, 107, and 108b by screwing the protruding portions of the shaft portions into female screw portions (not illustrated) provided on left and right portions of the case support structure 110.

In FIG. 8, reference signs 171L and 171R denote a pair of left and right lower brackets provided along the rear lower bent parts 144L and 144R of the left and right down frames 14L and 14R. Reference signs 172L and 172R denote a pair of left and right rearward extending parts that extend rearward from lower sides of the left and right rear frame parts 145L and 145R.

<Surrounding Structure of Head Pipe>

Figure 10:
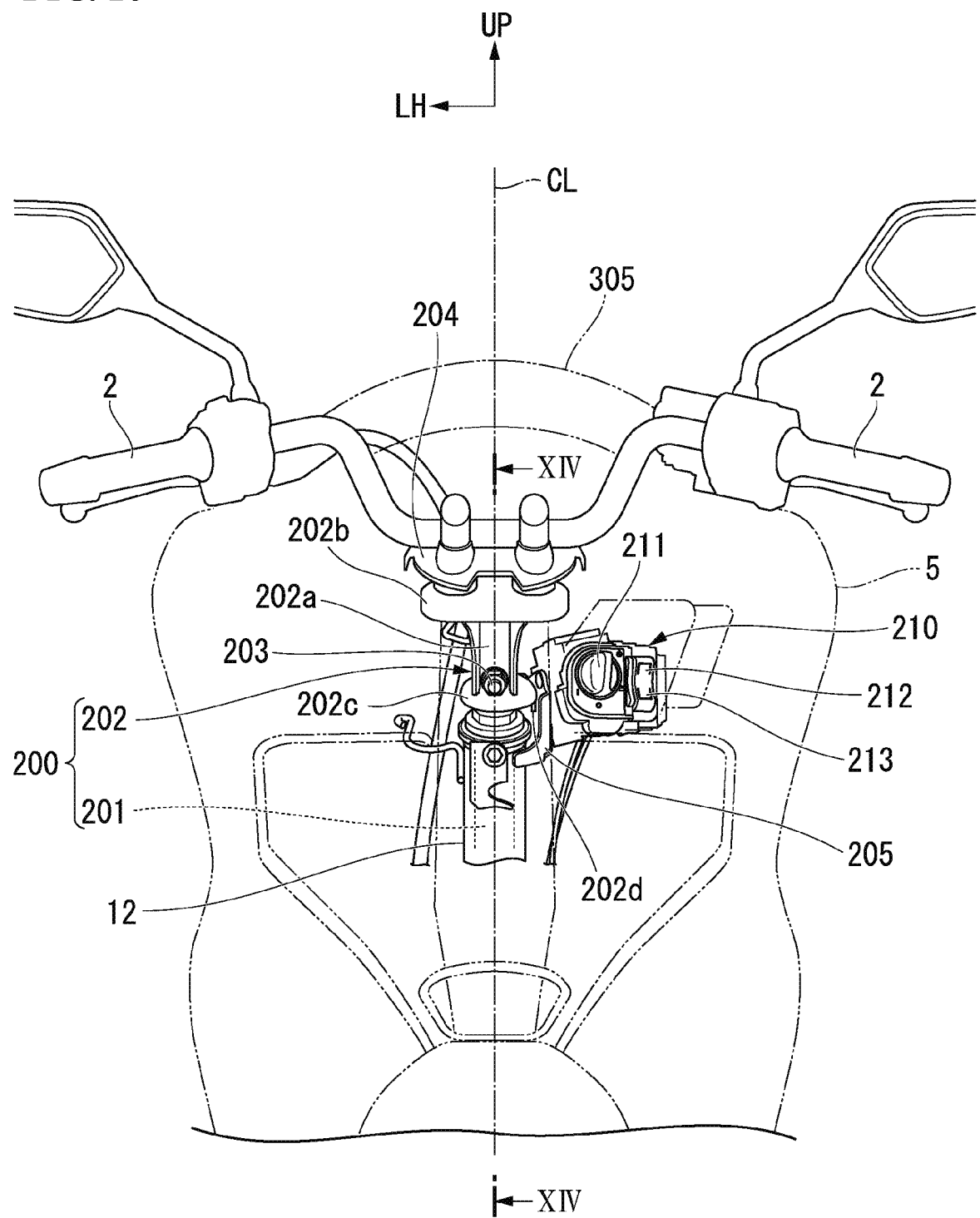
FIG. 10 is a rear view illustrating a surrounding structure of a head pipe according to the embodiment.

As illustrated in FIG. 10, a steering shaft 200 is attached to the head pipe 12. The steering shaft 200 includes a shaft main body 201 inserted into the head pipe 12 to be rotatably supported, and a handle post 202 connected to a portion of the shaft main body 201 (upper portion of the shaft main body 201) protruding upward from the head pipe 12.

The handle post 202 includes a cylindrical part 202a in which an upper portion of the shaft main body 201 is inserted inside and is non-rotatably connected by a bolt 203, a stay part 202b connected to close an upper end of the cylindrical part 202a and extending on both sides in the vehicle width direction, a cup part 202c which curves radially outward and downward from a lower end of the cylindrical part 202a, and a downward extending piece 202d extending downward from a right end portion of the cup part 202c. In FIG. 10, reference sign 204 denotes a handle holder fixed to the stay part 202b.

A switch bracket 205 that supports a switch holder 210 is attached to an upper right end portion of the head pipe 12. For example, the switch bracket 205 may be coupled to the head pipe 12 by welding or the like.

Figure 11:
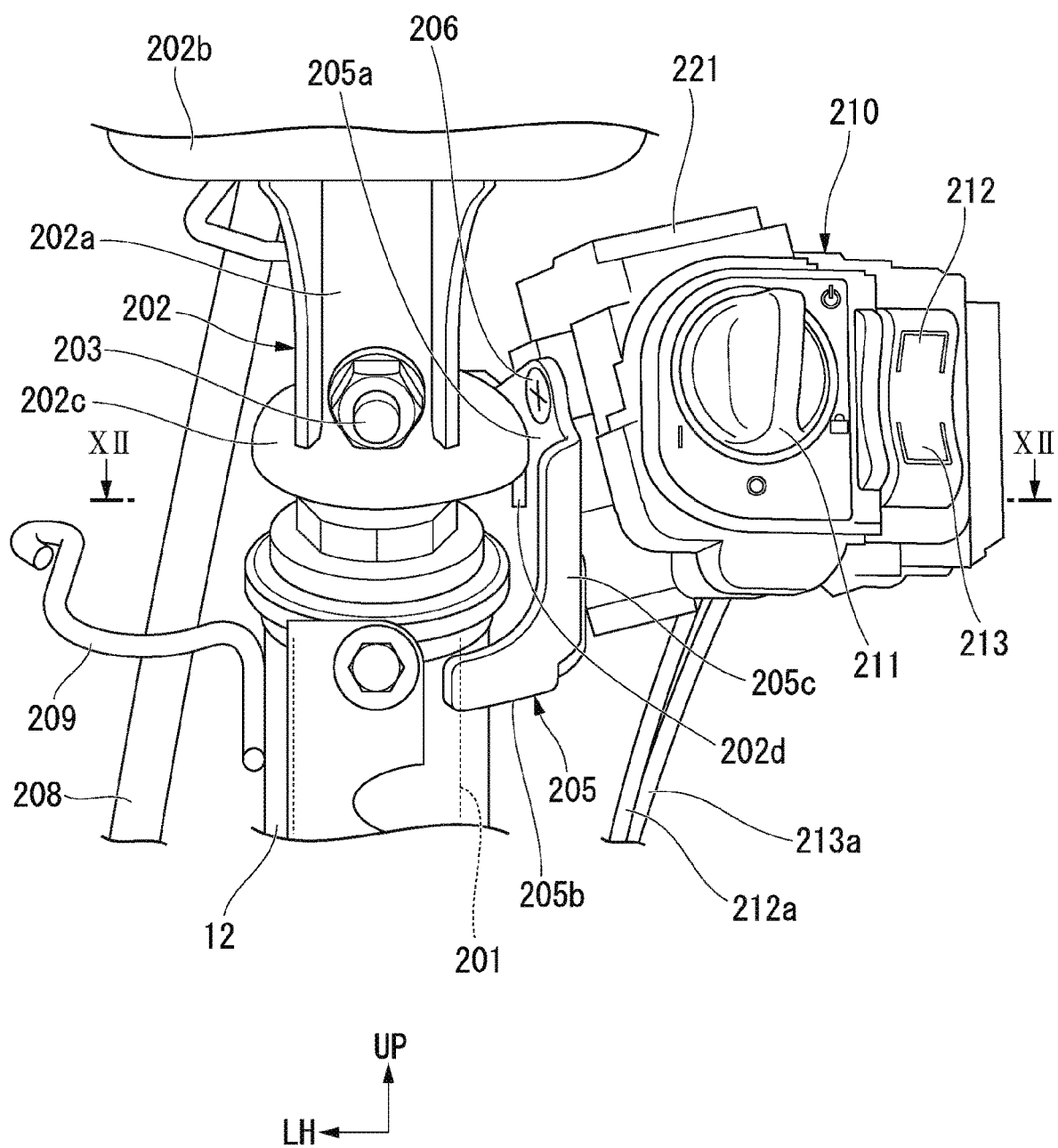
FIG. 11 is an enlarged view illustrating a main part of FIG. 10.

As illustrated in FIG. 11, the switch bracket 205 has an L shape that extends toward the right from the upper right end portion of the head pipe 12 and then extends to be bent upward. The switch bracket 205 includes a bracket main body 205a positioned on a lateral side of the downward extending piece 202d, a connecting part 205b that connects the bracket main body 205a and the upper right end portion of the head pipe 12, and a flange part 205c connecting the bracket main body 205a and the connecting part 205b.

The switch holder 210 is fixed to the bracket main body 205a using a bolt 206. A lock knob 211 which is an operation unit for locking the handle 2 (see FIG. 10), a seat switch 212 which is an operation unit for opening the seat 8 (see FIG. 1), and a lid switch 213 which is an operation unit for opening a lid 240 (see FIG. 13) are provided in the switch holder 210

The lock knob 211, the seat switch 212, and the lid switch 213 are disposed to be operable from behind the switch holder 210. In the rear view of FIG. 11, the lock knob 211 is provided on an inward side in the vehicle width direction of the switch holder 210. In the rear view of FIG. 11, the seat switch 212 is provided on an upper outer portion of the switch holder 210 in the vehicle width direction. In the rear view of FIG. 11, the lid switch 213 is provided on a lower outer portion of the switch holder 210 in the vehicle width direction. The seat switch 212 and the lid switch 213 are integrally provided to extend vertically on a right side of the lock knob 211.

For example, when the seat switch 212 is pressed, the seat 8 (see FIG. 1) can be opened. For example, when the lid switch 213 is pressed, the lid (see FIG. 13) can be opened (see FIG. 17). For example, when the lock knob 211 is turned counterclockwise (anticlockwise rotation), the handle 2 (see FIG. 10) can be locked.

In FIG. 11, reference sign 208 denotes a brake cable, reference sign 209 denotes a cable guide, reference sign 212a denotes a seat wire, reference sign 213a denotes a lid wire, and reference sign 221 denotes a smart unit including a microcomputer.

Figure 12:
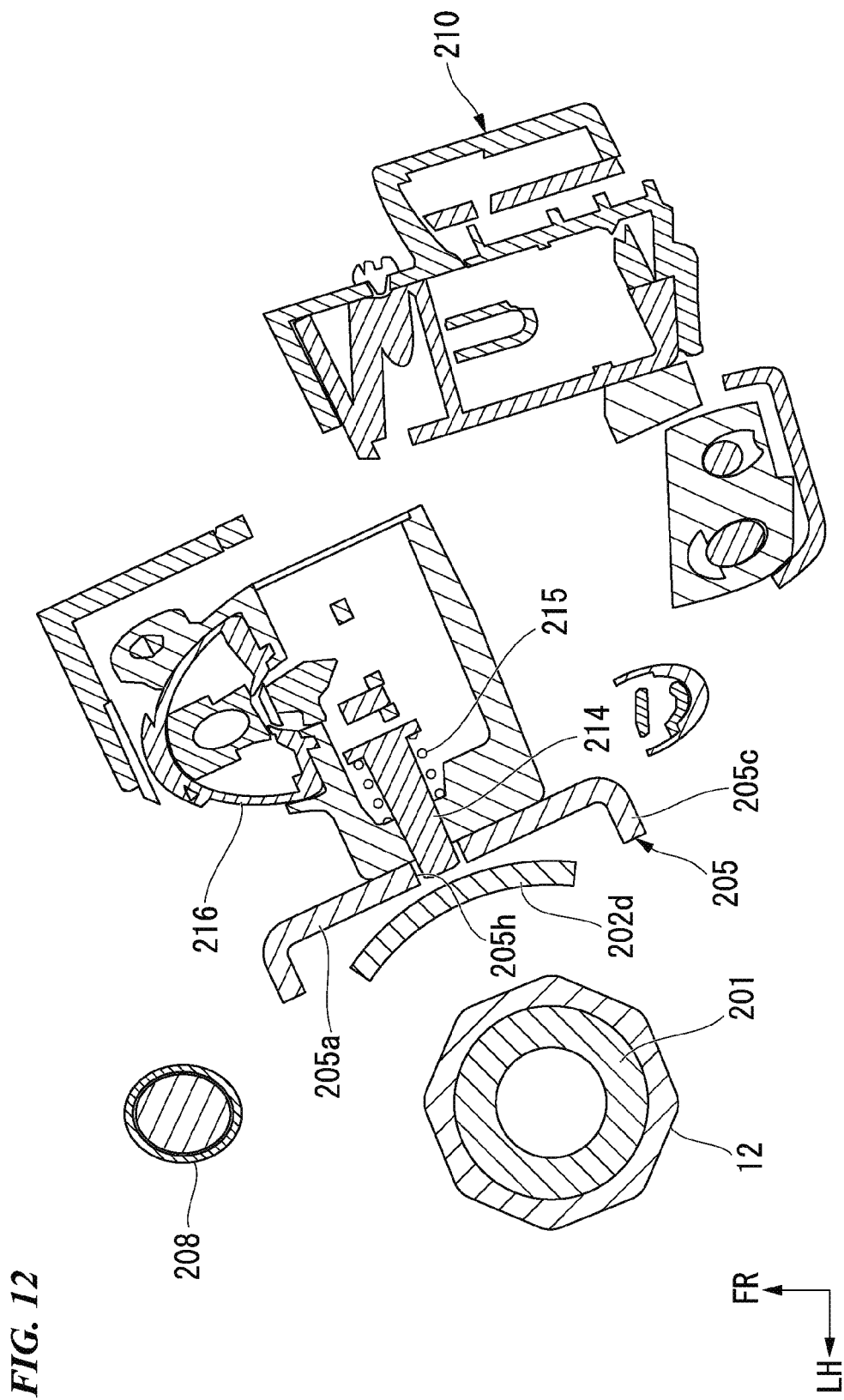
FIG. 12 is a view including a cross section along line XII-XII of FIG. 11.

In FIG. 12, reference sign 214 denotes a lock pin that is driven by an operation of the lock knob 211 (see FIG. 11), reference sign 215 denotes a biasing member that biases the lock pin 214 in a direction away from the head pipe 12, and reference sign 216 denotes a solenoid that can release a lock that restricts rotation of the lock knob 211 (see FIG. 12).

For example, the biasing member 215 may be a coil spring. According to rotation of the lock knob 211 (see FIG. 11), the lock pin 214 comes close to the head pipe 12 against a biasing force of the biasing member 215. The lock pin 214 comes close to the head pipe 12 through the through hole 205h of the bracket main body 205a. When the lock pin 214 comes close to the head pipe 12 and engages with the downward extending piece 202d, the handle 2 (see FIG. 10) is locked.

When the solenoid 216 is not energized (when an unlocking operation is not performed), an engagement of a plunger (not illustrated) of the solenoid 216 with the lock pin 214 prohibits movement of the lock pin 214.

When the solenoid 216 is energized (when the unlocking operation is performed), movement of the lock pin 214 is allowed due to the plunger of the solenoid 216 separated from the lock pin 214. When movement of the lock pin 214 is allowed, the lock pin 214 is pulled in a direction away from the head pipe 12 by a biasing force of the biasing member 215. When the lock pin 214 is pulled, the engagement between the lock pin 214 and the downward extending piece 202d is released and a handle lock is unlocked.

<Surrounding Structure of Center Tunnel>

Figure 13:
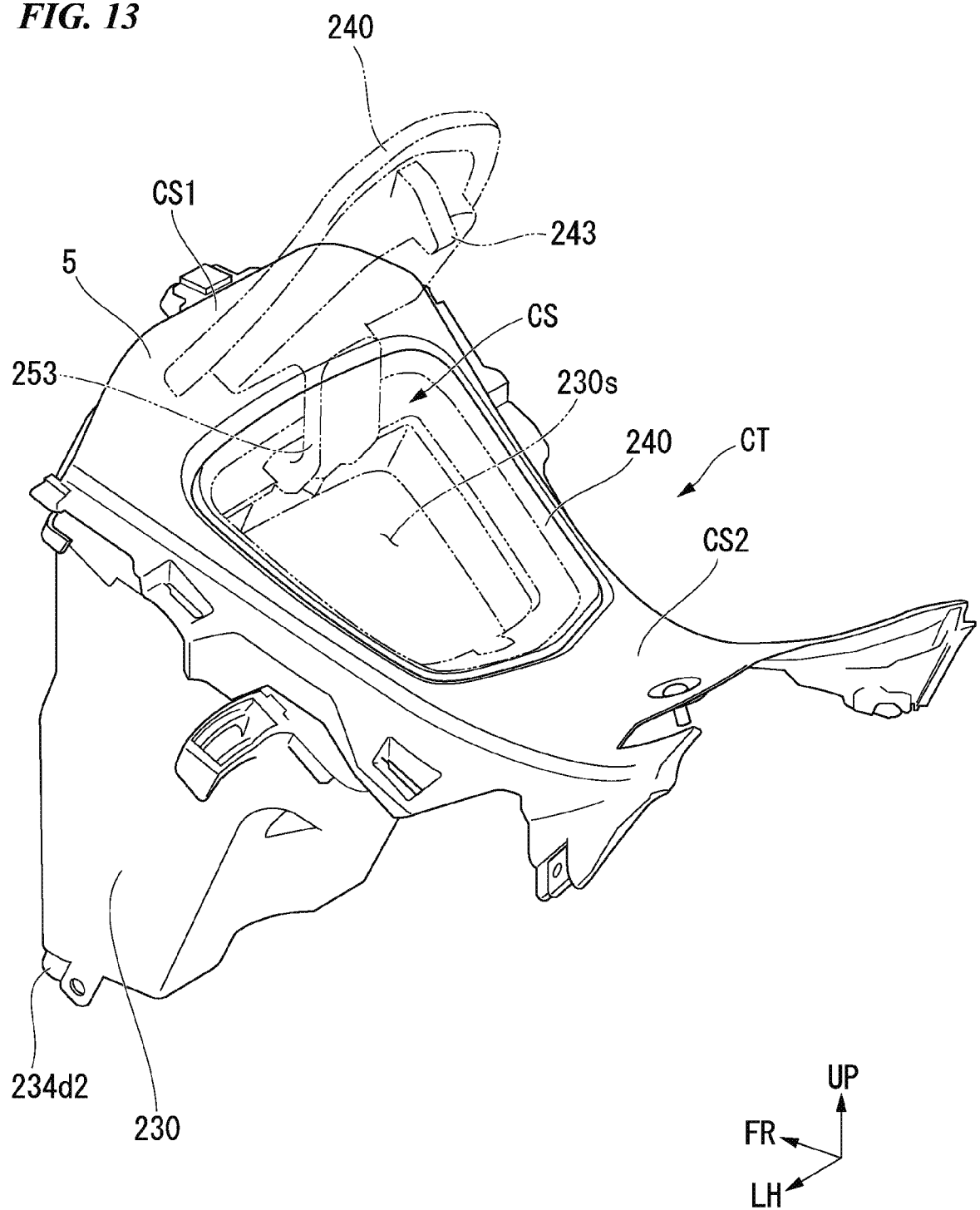
FIG. 13 is a perspective view of an opening/closing structure of a lid according to the embodiment when viewed from behind and from the left.

As illustrated in FIG. 13, a cover inclined surface CS that is inclined to be positioned further downward toward the rear with respect to the ground surface is provided in the center tunnel CT. A lid 240 capable of opening and closing the cord storage part 230 is provided in the center tunnel CT. The lid 240 is disposed on the upper portion of the center tunnel CT. Thereby, it is easy to visually ascertain an open/closed state of the lid 240. In addition, an opening and closing operation of the lid 240 can be easily performed.

In FIG. 13, a solid line indicates when the lid 240 is in a closed state, and a two-dot dashed line indicates when the lid 240 is in an open state.

When the lid 240 is in the closed state, the cover inclined surface CS is continuous with an upper surface of the lid 240 so that they are substantially coplanar with each other. Hereinafter, a portion positioned on an upper portion (front upper portion) of the cover inclined surface CS is also referred to as "inclined surface upper portion CS1," and a portion positioned on a lower portion (rear lower portion) of the cover inclined surface CS is also referred to as "inclined surface lower portion CS2." The inclined surface upper portion CS1 corresponds to a front end portion of the upper surface portion CT1 (see FIG. 6). The inclined surface lower portion CS2 corresponds to a rear end portion of the upper surface portion CT1 (see FIG. 6). The inclined surface lower portion CS2 corresponds to a portion including the lowest portion CT2 (see FIG. 6).

<Lid Open/Close Detection Unit>

Figure 14:
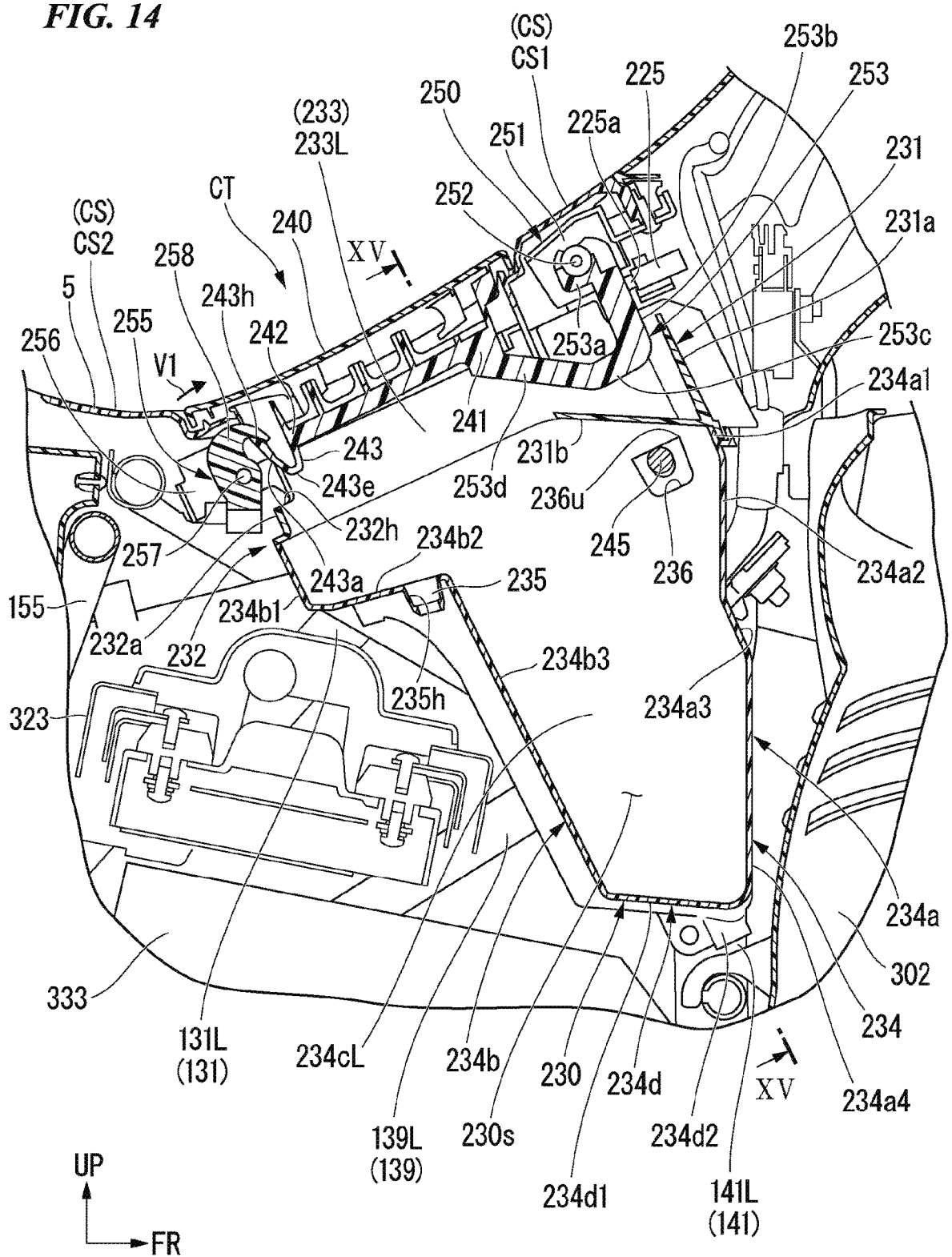
FIG. 14 is a view including a cross section along line XIV-XIV of FIG. 10.

As illustrated in FIG. 14, the lid open/close detection unit 225 capable of detecting an open/closed state of the lid 240 is provided in the center tunnel CT. The lid open/close detection unit 225 is disposed in the vicinity of the inclined surface upper portion CS1. For example, the lid open/close detection unit 225 includes a contact-type displacement sensor 225a.

Figure 18:
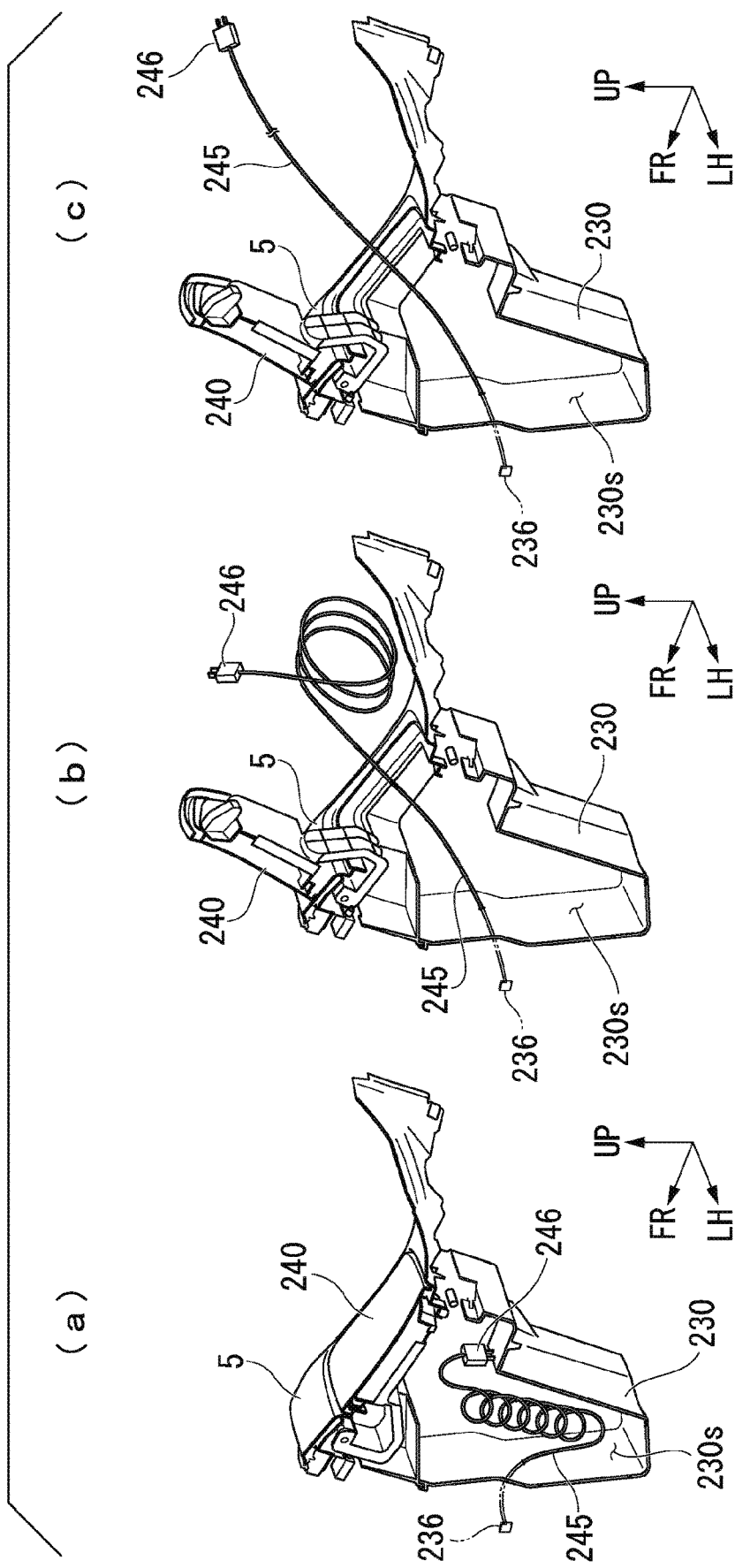
FIG. 18 shows perspective views illustrating a charging cord according to the embodiment.

The lid open/close detection unit 225 determines an open/closed state of the lid 240 on the basis of a gap generated between the lid 240 and the vehicle body cover 5. Here, the term "gap" means a gap generated between the lid 240 and the vehicle body cover 5 when the charging cord 245 is sandwiched between the lid 240 and the vehicle body cover 5. A size of the gap has substantially the same size as an outer diameter dimension of a portion of the charging cord 245 sandwiched between the lid 240 and the vehicle body cover 5. For example, when the lid 240 is closed in a state in which the charging cord 245 is drawn out (see FIG. 18(b) and FIG. 18(c)) from the cord storage part 230 to the outside, a gap corresponding to the outer diameter dimension of the charging cord 245 is generated between the lid 240 and the vehicle body cover 5.

Figure 16:
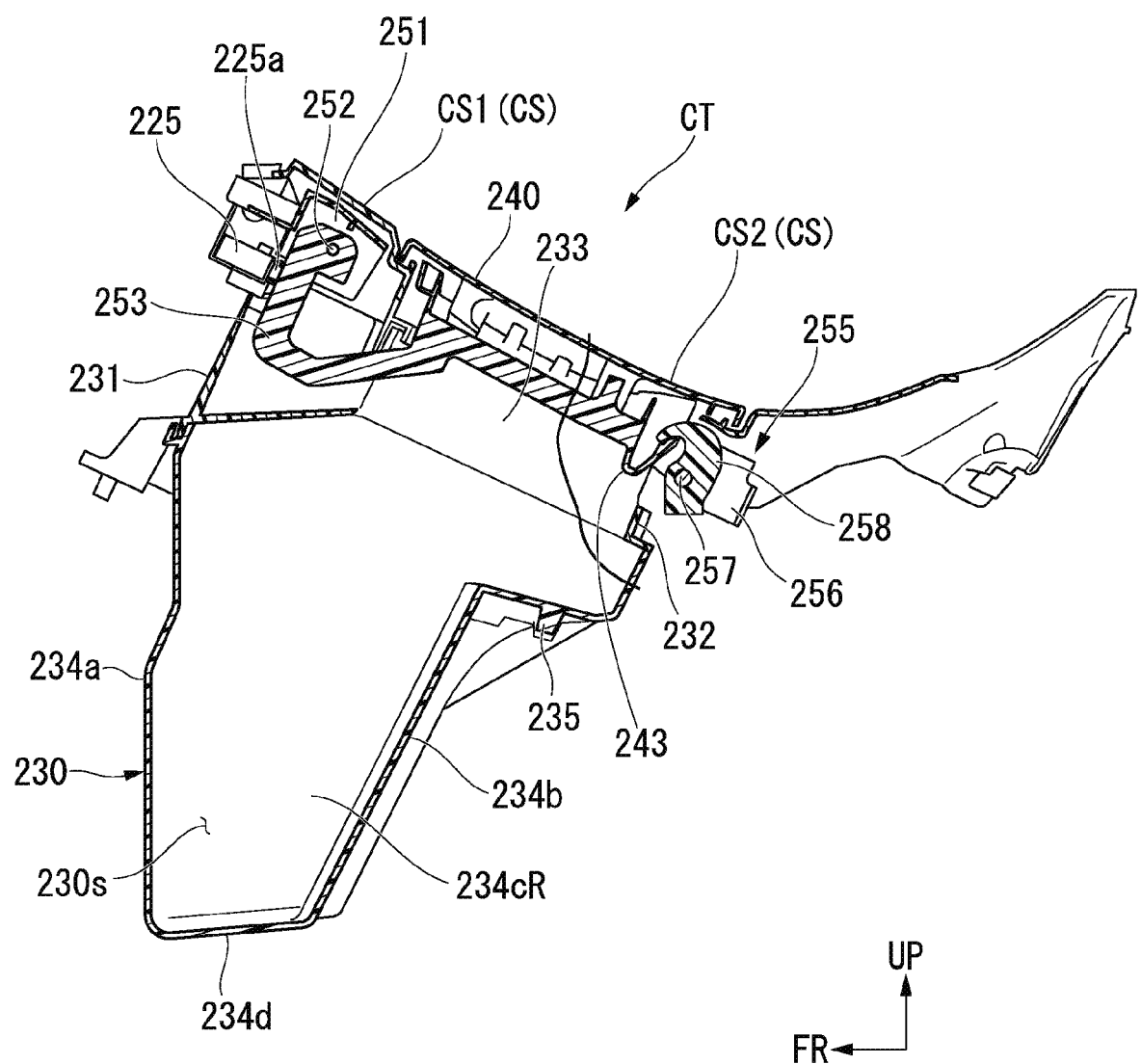
FIG. 16 is a view including a cross section illustrating a closed state of the lid according to the embodiment.
Figure 17:
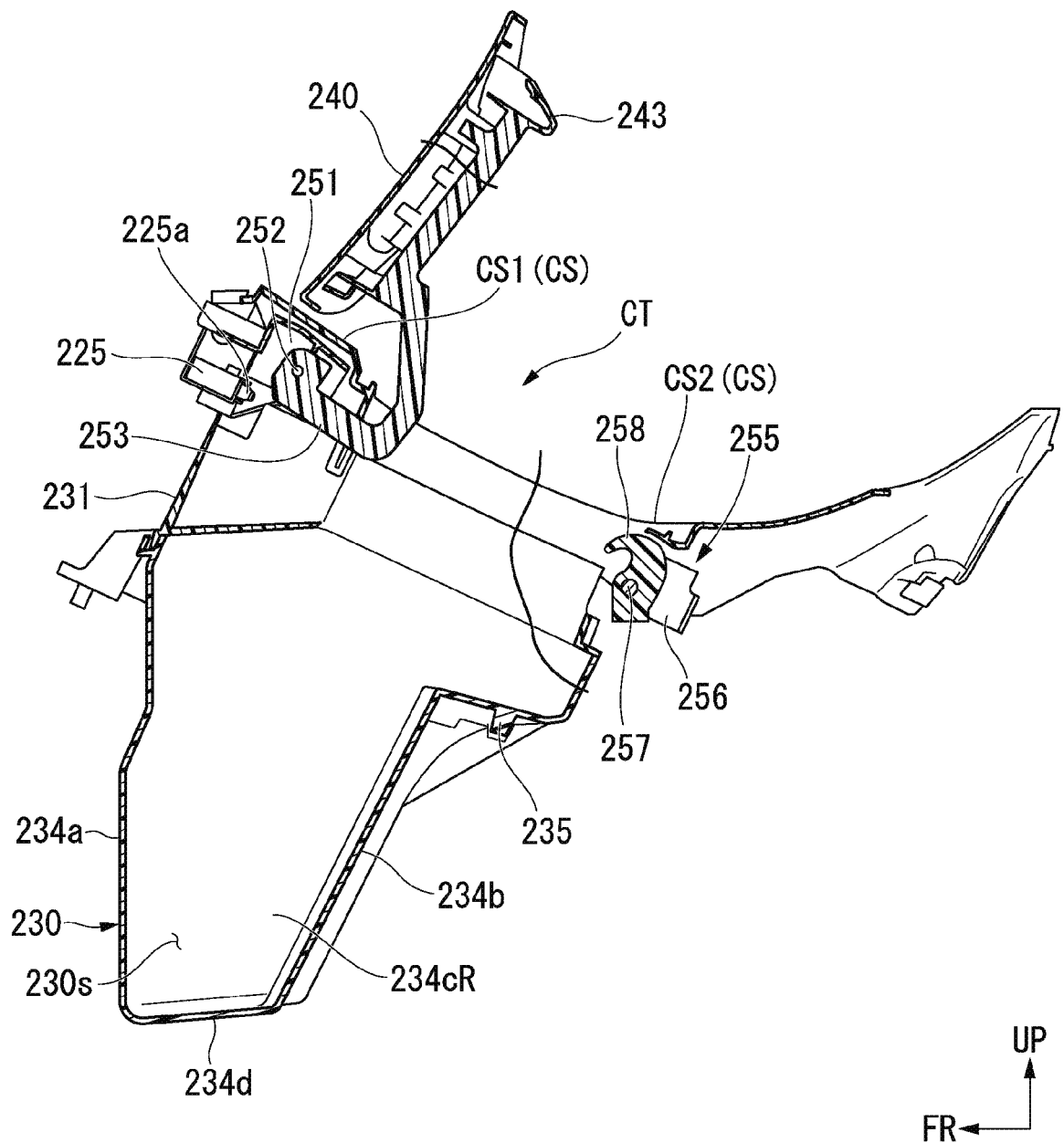
FIG. 17 is a view including a cross section illustrating an open state of the lid according to the embodiment.

The lid open/close detection unit 225 determines a size of the gap on the basis of a pushed-in amount of a hinge arm 253. FIG. 16 illustrates a state in which the contact-type displacement sensor 225a is pushed by the hinge arm 253. FIG. 17 illustrates a state in which the contact-type displacement sensor 225a is not pushed by the hinge arm 253.

The lid open/close detection unit 225 determines that the lid 240 is in an open state when the gap is equal to or larger than a minimum outer diameter dimension of the charging cord 245.

The lid open/close detection unit 225 determines that the lid 240 is in a closed state when the gap is less than the minimum outer diameter dimension of the charging cord 245.

Here, "minimum outer diameter dimension of the charging cord 245" means a smallest diameter dimension among outer diameter dimensions of the charging cord 245 in a direction in which the charging cord 245 extends. When the charging cord 245 is protected by a protective tube or the like, the outer diameter dimension of the charging cord 245 includes a dimension including a thickness of the protective tube or the like.

For example, the charging cord 245 may be a curl cord and freely deformable. A connection plug 246 (see FIG. 18) that can be connected to an external power supply is provided in the charging cord 245. The charging cord 245 connects the charger 325 (see FIG. 6) and an external power supply.

For example, the charging cord 245 can be stored in the cord storage part 230 in a state in which the charging cord 245 is spirally wound (see FIG. 18(a)).

For example, the charging cord 245 can be drawn out to the outside of the cord storage part 230 in a state in which a portion of the charging cord 245 is spirally wound (see FIG. 18(b)).

For example, the charging cord 245 can be drawn out to a position far away from a cord draw-out part 236 in a state in which the winding of the charging cord 245 is released (see FIG. 18(c)).

<Notification Device>

A notification device 226 (see FIG. 19) which notifies the rider on the basis of a detection result of the lid open/close detection unit 225 is provided inside the center tunnel CT. In the front view of FIG. 19, the notification device 226 is disposed on a side opposite to a horn 227 with the vehicle body left-right center line CL sandwiched therebetween. The notification device 226 is disposed on the left side of the vehicle body. For example, the notification device 226 may be a speaker. For example, the notification device 226 can be used as an approach notification to the outside of the vehicle. For example, the notification device 226 may generate a notification sound to the outside until reaching a predetermined speed after the vehicle starts.

For example, the notification device 226 may issue an alarm (first alarm) when the lid open/close detection unit 225 detects an open state of the lid 240. For example, the notification device 226 issues a second alarm that is different from the first alarm when the lid open/close detection unit 225 detects a closed state of the lid 240. The notification device 226 may not issue an alarm when the lid open/close detection unit 225 detects a closed state of the lid 240.

Figure 19:
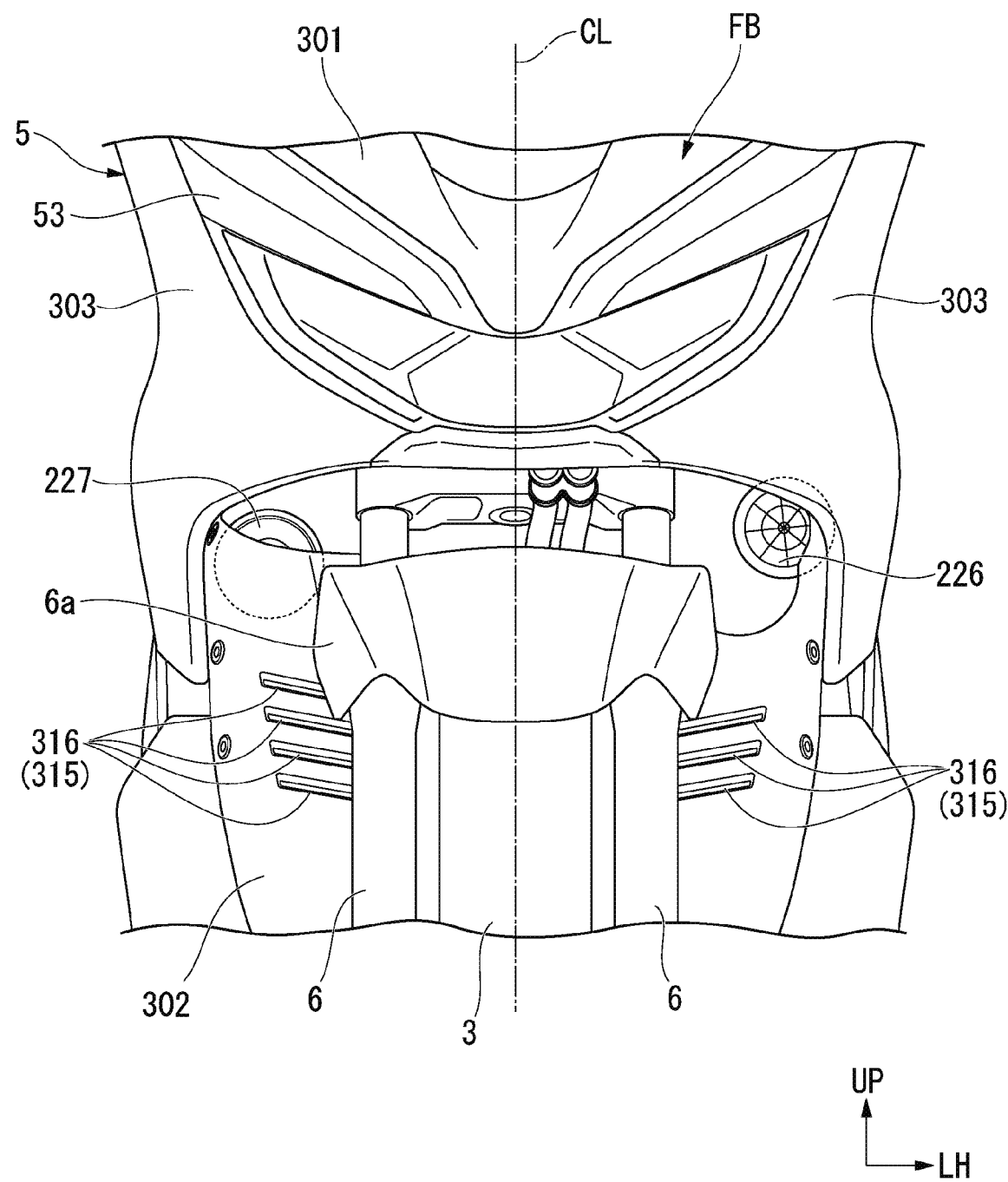
FIG. 19 is a front view illustrating a disposition of a notification device according to the embodiment.

In FIG. 19, reference sign 303 denotes a pair of left and right front side covers that cover left and right portions of the front body FB from an outer lateral side. As illustrated in FIG. 19, the left airflow guide hole 315 has three-stage openings 316 vertically. The right airflow guide hole 315 has four-stage openings 316 vertically.

<Hinge Mechanism>

As illustrated in FIG. 14, a hinge mechanism 250 capable of opening and closing the lid 240 is provided in the center tunnel CT. The hinge mechanism 250 is disposed in the vicinity of the inclined surface upper portion CS1.

The hinge mechanism 250 includes a hinge bracket 251 fixed to a lower portion of the inclined surface upper portion CS1, a hinge shaft 252 extending in the vehicle width direction and having an end portion fixed to the hinge bracket 251, and the hinge arm 253 rotatably attached to the hinge shaft 252.

In a cross-sectional view of FIG. 14, the hinge arm 253 includes a hinge shaft support part 253a rotatably attached to the hinge shaft 252, an arm front-half part 253b that extends obliquely forward and downward in a straight line from the hinge shaft support part 253a, an arm intermediate part 253c that is continuous with a lower end of the arm front-half part 253b and extends obliquely rearward and downward, and an arm rear-half part 253d that is continuous with a rear end of the arm intermediate part 253c and extends obliquely rearward and upward. A front lower portion 241 of the lid 240 is connected to a rear end of the arm rear-half part 253d.

A forward/downward protruding part 243 that protrudes forward and downward is provided at a rear lower portion 242 of the lid 240. In the cross-sectional view of FIG. 14, the forward/downward protruding part 243 includes a lock wall 243a that is inclined to be positioned further upward toward the rear. A lock hole 243h that opens to the front and rear so that a hook 258 of a lock mechanism 255 can be inserted therethrough is provided in the lock wall 243a.

<Lock Mechanism>

As illustrated in FIG. 14, the lock mechanism 255 capable of locking the lid 240 is provided in the center tunnel CT. The lock mechanism 255 is disposed in the vicinity of the inclined surface lower portion CS2.

The lock mechanism 255 includes a lock bracket 256 fixed to a lower portion of the inclined surface lower portion CS2, a lock shaft 257 extending in the vehicle width direction and having an end portion fixed to the lock bracket 256, the hook 258 rotatably attached to the lock shaft 257, a biasing member (not illustrated) connected to the lock bracket 256 and the hook 258, a lid wire 213a (not illustrated) connected to the hook 258, and an actuator (not illustrated) capable of rotating the hook 258.

The biasing member (not illustrated) applies a biasing force with respect to the hook 258 in an arrow V1 direction around the lock shaft 257 so that the hook 258 is locked to the lock wall 243a. For example, the biasing member may be a coil spring.

An actuator (not illustrated) can apply a force against the biasing force of the biasing member with respect to the hook 258 in a direction opposite to the arrow V1 direction so that the hook 258 is disengaged from the lock wall 243a. For example, a cable (not illustrated) may be connected between the hook 258 and the actuator. The actuator can release engagement of the hook 258 by pulling the cable (not illustrated) against the biasing force of the biasing member.

<Cord Storage Part>

As illustrated in FIG. 14, the cord storage part 230 capable of storing the charging cord 245 is provided in the center tunnel CT. The cord storage part 230 has a box shape that opens upward. The cord storage part 230 can store articles other than the charging cord 245. For example, other articles can also be stored in the cord storage part 230 in a state in which the charging cord 245 is stored in the cord storage part 230.

The cord storage section 230 is disposed in the front-rear direction between the left and right front down frame parts 141L and the center cross frame 155. An upper portion of the cord storage part 230 is disposed in the vehicle width direction between the upper frame front-half portions 131L and 131R. A lower portion of the cord storage part 230 is disposed in the vehicle width direction between the left and right middle frames 139L and 139R.

The cord storage part 230 includes a hinge storage part 231 capable of storing the hinge mechanism 250, a lock storage part 232 capable of storing the lock mechanism 255, a pair of left and right connecting parts 233L and 233R which connect the hinge storage part 231 and the lock storage part 232, and a cord storage main body 234 capable of storing the charging cord 245.

The hinge storage part 231 is disposed on a front upper side of the cord storage main body 234. The hinge storage part 231 is positioned in the vicinity of the inclined surface upper portion CS1. When the lid 240 is in a closed state, the hinge storage part 231 includes a hinge front wall 231a positioned in front of the hinge mechanism 250 and a hinge lower wall 231b positioned below the hinge mechanism 250. In the cross-sectional view of FIG. 14, the hinge front wall 231a extends obliquely in a straight line to be positioned further downward toward the front. In the cross-sectional view of FIG. 14, the hinge lower wall 231b is continuous with a lower end of the hinge front wall 231a and extends obliquely in a straight line to be positioned further upward toward the rear.

The lock storage part 232 is disposed on a rear upper side of the cord storage main body 234. The lock storage part 232 is positioned in the vicinity of the inclined surface lower portion CS2. When the lid 240 is in a closed state, the lock storage part 232 includes a lock lower wall 232a positioned below the lock mechanism 255. In the cross-sectional view of FIG. 14, the lock lower wall 232a is formed in an L-shape that is inclined to be positioned further downward toward the front in substantially parallel with the hinge front wall 231a, and then extends to be bent rearward and downward. An opening part 232h that opens to the front and rear to allow the hook 258 of the lock mechanism 255 to rotate is provided in the lock storage part 232.

The left and right connecting parts 233L and 233R respectively stretch in the front-rear direction between the hinge storage part 231 and the lock storage part 232. In the cross-sectional view of FIG. 14, connecting parts 233 extend obliquely to be positioned further downward toward the rear.

The cord storage main body 234 includes wall parts that are positioned on the front, rear, left, right, and a bottom part of the cord storage part 230. Hereinafter, in the cord storage part 230, a wall part positioned on a front side is also referred to as a "front wall part 234a," a wall part positioned on a rear side is also referred to as a "rear wall part 234b," a wall part positioned on a left side is also referred to as a "left wall part 234cL," a wall part positioned on a right side is also referred to as a "right wall part 234cR," and a wall part positioned on the bottom part is also referred to as a "storage bottom part 234d."

In the cross-sectional view of FIG. 14, the front wall part 234a includes a front wall upper coupling part 234a1 coupled to a front lower end of the hinge lower wall 231b, a front wall upper half part 234a2 that is continuous with a lower end of the front wall upper coupling part 234a1 and extends downward in a straight line, a front wall intermediate part 234a3 that is continuous with a lower end of the front wall upper half part 234a2 and extends to be bent forward and downward, and a front wall intermediate part 234a4 that is continuous with a lower end of the front wall intermediate part 234a3 and extends downward in a straight line.

In the cross-sectional view of FIG. 14, the rear wall part 234b includes a rear wall upper half part 234b1 that is continuous with a rear lower end of the lock lower wall 232a and extends obliquely to be positioned further downward toward the front, a rear wall intermediate part 234b2 that is continuous with a lower end of the rear wall upper half part 234b1 and extends to be bent forward and upward, and a rear wall lower half part 234b3 that is continuous with a front end of the rear wall intermediate part 234b2 and extends obliquely in a straight line to be positioned further downward toward the front.

The left and right wall parts 234cL and 234cR respectively stretch in the front-rear direction between left ends and between right ends of the front and rear wall parts 234a and 234b. In a cross-sectional view of FIG. 15, the left and right wall parts 234cL and 234cR include left and right coupling parts 234c1 that are continuous with the front wall upper coupling part 234a1 (see FIG. 14) and coupled to lower ends of the left and right connecting parts 233L and 233R, and left and right wall main bodies 234c2 that are continuous with inward ends in the vehicle width direction of the left and right coupling parts 234c1 and extend obliquely in a straight line to be positioned further inward in the vehicle width direction toward a lower side thereof.

The storage bottom part 234d stretches in the front-rear direction between lower ends of the front and rear wall parts 234a and 234b (see FIG. 14) and stretches in the vehicle width direction between lower ends of the left and right wall parts 234cL and 234cR. In the cross-sectional view of FIG. 15, the storage bottom part 234d includes a bottom part main body 234d1 that extends obliquely in a straight line to be positioned further downward toward a left side, and a downward protruding part 234d2 that is continuous with a left end of the bottom part main body 234d1 and protrudes downward.

In the cross-sectional view of FIG. 14, the bottom part main body 234d1 extends obliquely in a straight line to be positioned further downward toward the front. The storage bottom part 234d is formed to be deepest on the inclined surface upper portion CS1 side.

Figure 15:
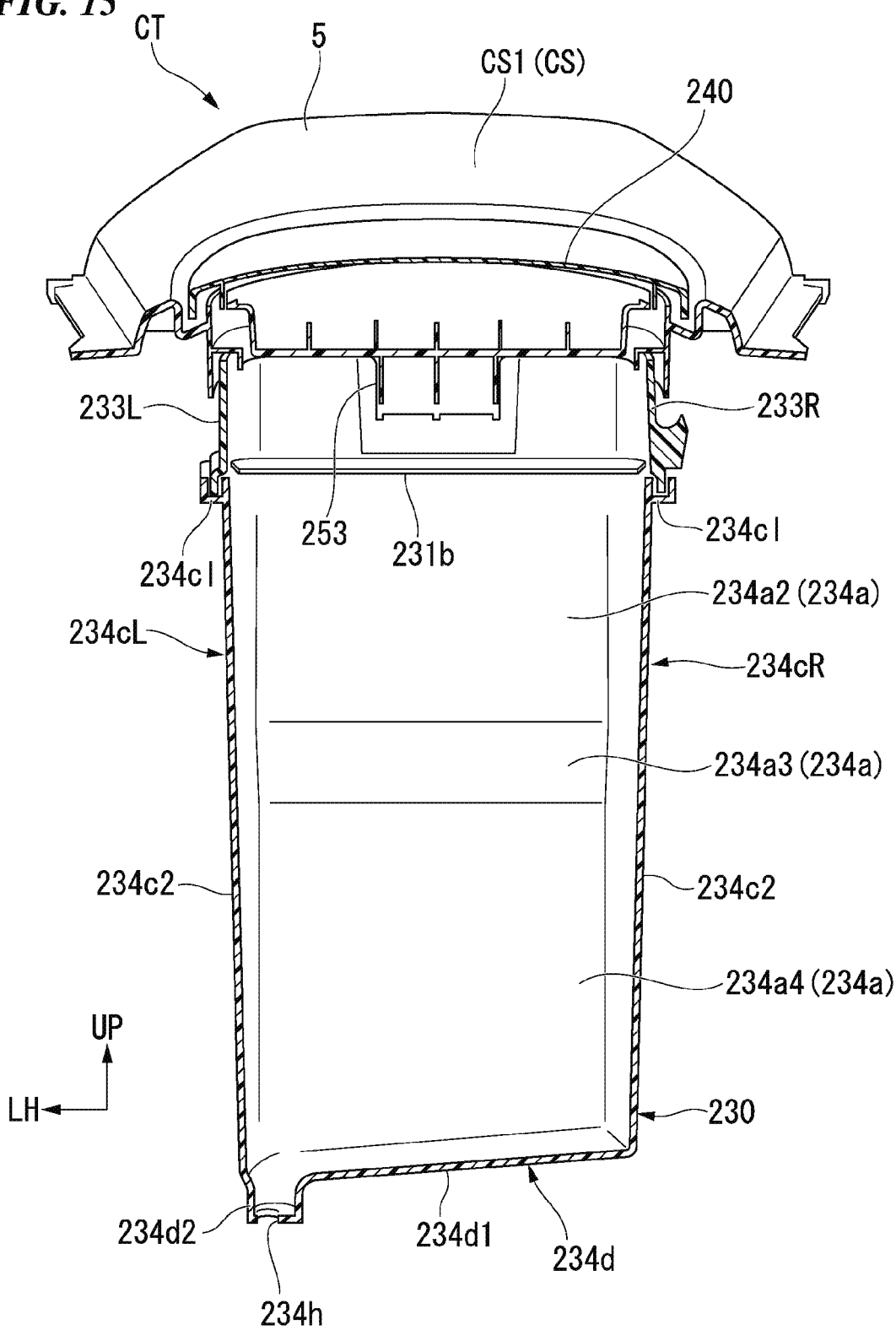
FIG. 15 is a view including a cross section along line XV-XV of FIG. 14.

As illustrated in FIG. 15, a drain hole 234h that opens upward and downward is provided at a lower end of the downward protruding part 234d2.

<Plug Fixing Part>

As illustrated in FIG. 14, a plug fixing part 235 capable of fixing the connection plug 246 (see FIG. 18) is provided in the cord storage part 230. The plug fixing part 235 is disposed in the vicinity of the inclined surface lower portion CS2. The plug fixing part 235 is provided to protrude forward and downward from the rear wall intermediate part 234b2. For example, an insertion hole 235h into which the connection plug 246 can be inserted from above is provided in the plug fixing part 235.

<Cord Draw-Out Part>

As illustrated in FIG. 14, the cord draw-out part 236 that allows the charging cord 245 to be drawn out into the cord storage part 230 is provided in the cord storage part 230. The cord draw-out part 236 is a hole that opens the left wall part 234cL of the cord storage part 230 in the vehicle width direction.

In the cross-sectional view of FIG. 14, the cord draw-out part 236 is formed in a rectangular shape having an upper side that is linearly inclined to be positioned further downward toward the rear. A length of each side of the cord draw-out part 236 is larger than a diameter of the charging cord 245. In the vertical direction, the cord draw-out part 236 overlaps the rear lower portion 242 of the lid 240. An upper end 236u of the cord draw-out part 236 is positioned on a side above the plug fixing part 235. The cord draw-out part 236 is disposed on a side above a lower end 243e of the lid 240.

A storage space 230s of the cord storage part 230 extends to a lowest side below the cord draw-out part 236. The storage space 230s can store the charging cord 245 drawn out from the cord draw-out part 236 in a portion ranging from the vicinity of an upper portion of the inclined surface upper portion CS1 to the lower portion of the cord storage part 230.

<Control System>

Figure 20:
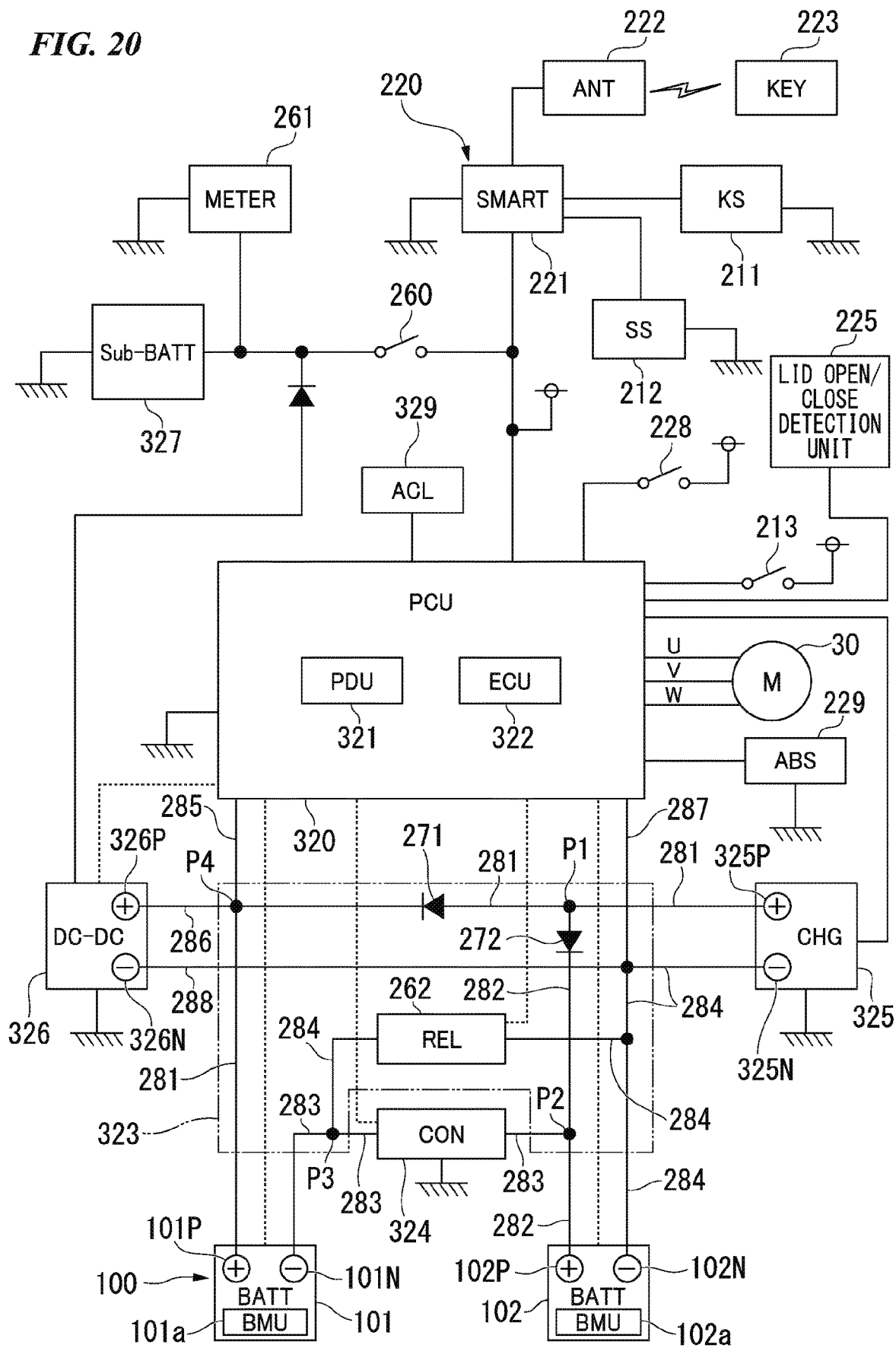
FIG. 20 is a block diagram illustrating a control system of the motorcycle according to the embodiment.

As illustrated in FIG. 20, a power driver unit (PDU) 321 and an electric control unit (ECU) 322 constitute the PCU 320 serving as an integrated control unit.

Electric power from the battery 100 is supplied to the PDU 321 serving as a motor driver via the contactor 324 which is linked to a main switch 260. The electric power from the battery 100 is converted from a direct current into a three-phase alternating current by the PDU 321 and then supplied to the motor 30 which is a three-phase alternating current motor.

An output voltage from the battery 100 is stepped down via a direct current-direct current (DC-DC) converter 326 and is used for charging a sub battery 327 having a rating of 12 V. The sub battery 327 supplies electric power to general electrical components such as a lighting device, and control system components such as a meter 261, a smart unit 221, and the ECU 322. When the sub battery 327 is mounted, electromagnetic locks of various types or the like can be operated even when the battery 100 (hereinafter also referred to as "main battery 100") is removed.

Since the sub battery 327 is charged via the DC-DC converter 326 in a state in which the main battery 100 is connected, the sub battery 327 is charged when the vehicle travels with the main battery 100 attached. Therefore, general electrical components and control system components can be prevented from becoming inoperable due to reduction in power of the sub battery 327.

Although not illustrated, the PDU 321 includes an inverter having a bridge circuit in which a plurality of switching elements such as transistors are used, smoothing capacitors, and the like. The PDU 321 controls energization for stator winding of the motor 30. The motor 30 performs a power running operation according to control of the PDU 321 to cause the vehicle to travel.

The battery 100 is charged by a charger 325 connected to an external power supply in a state in which it is mounted on the vehicle body. The battery 100 (the front and rear batteries 101 and 102) can be charged by a charger outside the vehicle in a state in which it is removed from the vehicle body.

The front and rear batteries 101 and 102 respectively include battery managing units (BMUs) 101a and 102a which monitor a charge/discharge status, a temperature, or the like. Information monitored by the BMUs 101a and 102a is shared with the ECU 322 when the front and rear batteries 101 and 102 are mounted on the vehicle body. Output request information from an accelerator sensor 329 is input to the ECU 322. The ECU 322 controls driving of the motor 30 via the PDU 321 on the basis of the output request information that has been input.

For example, the ECU 322 may regulate charging/discharging of the battery 100 by controlling the battery 100. For example, the ECU 322 may switch between supplying electric power to the battery 100 and discharging from the battery 100 by controlling the contactor 324 and a relay 262.

A first diode 271 rectifies a current flowing between a high potential side terminal 325P of the charger 325 and a high potential side terminal 101P of the front battery 101. For example, the first diode 271 may cause a current to flow in a direction from the high potential side terminal 325P of the charger 325 toward the high potential side terminal 101P of the front battery 101.

A second diode 272 rectifies a current flowing between the high potential side terminal 325P of the charger 325 and a high potential side terminal 102P of the rear battery 102. For example, the second diode 272 may cause a current to flow in a direction from the high potential side terminal 325P of the charger 325 toward the high potential side terminal 102P of the rear battery 102.

The current flowing through the first diode 271 and the current flowing through the second diode 272 are different from each other. Polarities of the high potential side terminal 325P of the charger 325, the high potential side terminal 101P of the front battery 101, and the high potential side terminal 102P of the rear battery 102 are the same polarity. For example, polarities of the high potential side terminal 325P of the charger 325, the high potential side terminal 101P of the front battery 101, and the high potential side terminal 102P of the rear battery 102 are positive.

The first diode 271 that corresponds to the front battery 101 and the second diode 272 that corresponds to the rear battery 102 are provided to protect respective parts from the following events.

When the first diode 271 and the second diode 272 are provided, backflow of currents from each of the high potential side terminal 101P of the front battery 101 and the high potential side terminal 102P of the rear battery 102 to the high potential side terminal 325P of the charger 325 is prevented.

When the first diode 271 is provided, the front battery 101 is prevented from being short-circuited in a case in which the battery 100 is connected in series.

In a conductor 281 and a conductor 282 that connect the high potential side terminal 101P of the front battery 101 and the high potential side terminal 102P of the rear battery 102, when the first diode 271 and the second diode 272 are provided in opposite directions to each other, in a case in which a short-circuiting failure occurs at one of the front battery 101 and the rear battery 102, short-circuiting on the other is prevented.

The contactor 324 connects or disconnects a connection between a low potential side terminal 101N of the front battery 101 and the high potential side terminal 101P of the rear battery 102. For example, the contactor 324 may connect the low potential side terminal 101N of the front battery 101 and the high potential side terminal 102P of the rear battery 102 in a conductive state. The contactor 324 connects the battery 100 in series in a conductive state and disconnects the serial connection of the battery 100 in a cut-off state. A period in which the contactor 324 is in a cut-off state includes at least a period in which the charger 325 supplies electric power to the battery 100.

The relay 262 connects or disconnects a connection between the low potential side terminal 101N of the front battery 101 and a low potential side terminal 102N of the rear battery 102. For example, the relay 262 may connect the low potential side terminal 101N of the front battery 101 and the low potential side terminal 102N of the rear battery 102 in a conductive state. A period in which the relay 262 is in a conductive state includes at least a period in which the charger 325 supplies electric power to the battery 100.

Opposite ends of the battery 100 connected in series are connected to the PDU 321. The front battery 101 and the rear battery 102 in the battery 100 are connected in series or in parallel by switching states of the contactor 324 and the relay 262. The contactor 324, the relay 262, the first diode 271, and the second diode 272 are examples of connection switching devices. The diodes 271 and 272, the relay 262, and connection parts (branch points P1 to P4) are included in the junction box 323.

<Example of Connection Configuration of Electrical Circuit Drive System>

Respective parts of the electrical circuit drive system are electrically connected as follows by conductors (lead wires) including a first conductor 281, a second conductor 282, a third conductor 283, a fourth conductor 284, a fifth conductor 285, a sixth conductor 286, a seventh conductor 287, and an eighth conductor 288.

The high potential side terminal 101P of the front battery 101 and the high potential side terminal 325P of the charger 325 are electrically connected by the first conductor 281. The first diode 271 is inserted into the first conductor 281. For example, a cathode of the first diode 271 may be connected to the high potential side terminal 101P of the front battery 101, and an anode of the first diode 271 may be connected to the high potential side terminal 325P of the charger 325. The first branch point P1 is provided between the anode of the first diode 271 and the high potential side terminal 325P of the charger 325.

The first branch point P1 and the high potential side terminal 102P of the rear battery 102 are electrically connected by the second conductor 282. The second diode 272 is inserted into the second conductor 282. For example, a cathode of the second diode 272 may be connected to the high potential side terminal 102P of the rear battery 102, and an anode of the second diode 272 may be connected to the high potential side terminal 325P of the charger 325 via the first branch point P1. The second branch point P2 is provided between the cathode of the second diode 272 and the high potential side terminal 102P of the rear battery 102.

The second branch point P2 and the low potential side terminal 101N of the front battery 101 are electrically connected by the third conductor 283. A contact of the contactor 324 is inserted into the third conductor 283. The third branch point P3 is provided in the third conductor 283. A position of the third branch point P3 is between the contactor 324 and the low potential side terminal 101N of the front battery 101.

The third branch point P3 and a low potential side terminal 325N of the charger 325 are electrically connected by the fourth conductor 284. A contact of the relay 262 is inserted into the fourth conductor 284.

The low potential side terminal (102N) of a lower potential side battery (the rear battery 102) among the batteries connected in series and the low potential side terminal 325N of the charger 325 are electrically connected by the fourth conductor 284.

The fourth branch point P4 is provided between the cathode of the first diode 271 and the high potential side terminal 101P of the front battery 101.

The fourth branch point P4 and a high potential side terminal of the PDU 321 are electrically connected by the fifth conductor 285.

The fourth branch point P4 and a high potential side terminal 326P of the DC-DC converter 326 are electrically connected by the sixth conductor 286.

A low potential side terminal of the PDU 321 is connected to the low potential side terminal 325N of the charger 325 by the seventh conductor 287.

A low potential side terminal 326N of the DC-DC converter 326 is connected to the low potential side terminal 325N of the charger 325 by the eighth conductor 288.

The electrical circuit may include connections of a monitoring control system indicated by a broken line in the drawing in addition to the connections of the drive system described above. The electrical circuit may include the ECU 322.

<Operation of Electrical Circuit>

The ECU 322 acquires a state of the battery 100 from the respective BMUs 101a and 102a. The ECU 322 detects an operation of a user from the accelerator sensor 329 or the like. The ECU 322 controls the contactor 324, the relay 262, and the PDU 321 on the basis of collected information.

For example, when the battery 100 is charged with electric power from the charger 325, the ECU 322 may perform control such that the contactor 324 is in a cut-off state and the relay 262 is in a conductive state. When the front battery 101 and the rear battery 102 are in a state of being connected in parallel, electric power from the charger 325 is supplied to the front battery 101 and the rear battery 102. In a case of the control state described above, this is in a state in which electric power from the charger 325 can be supplied to the PDU 321. A voltage from the charger 325 to the PDU 321 is the same as a voltage applied between the terminals of the front battery 101.

For example, when the PDU 321 is driven with electric power accumulated in the battery 100, the ECU 322 may perform control such that the contactor 324 in a conductive state and the relay 262 is in a cut-off state. When the front battery 101 and the rear battery 102 are in a state of being connected in series, the front battery 101 and the rear battery 102 supply electric power to the PDU 321. In a case described above, the first diode 271 is reverse-biased. Due to the reverse bias described above, a voltage (for example, 96 V) of the high potential side terminal 101P of the front battery 101 is not applied to the high potential side terminal 102P of the rear battery 102 and the high potential side terminal 325P of the charger 325.

<ABS>

An anti-lock brake system (ABS) 229 is electrically connected to the PCU 320. When drive wheels are locked at the time of sudden braking or the like, the ABS 229 has functions of automatically repeating release and operation of a brake even while the brake remains applied to restore a tire grip force and maintaining traveling stability of the vehicle. The ABS 229 also functions as a vehicle state detection unit capable of detecting a traveling state and a stopped state of the vehicle. For example, the ABS 229 includes a wheel speed sensor (not illustrated) that can detect a wheel speed.

<Operation of PCU>

The PCU 320 also functions as a control unit that controls the vehicle on the basis of detection results of a lid open/close detection unit 225 and the ABS 229.

When the ABS 229 detects a stopped state of the vehicle and the lid open/close detection unit 225 detects an open state of the lid 240 (see FIG. 17), the PCU 320 prohibits traveling of the vehicle.

When the ABS 229 detects a traveling state of the vehicle and the lid open/close detection unit 225 detects an open state of the lid 240 (see FIG. 17), the PCU 320 prohibits traveling of the vehicle after the vehicle has stopped.

Here, the stopped state of the vehicle includes not only a state in which the vehicle is completely stopped but also a state in which the vehicle is substantially stopped (a state in which the vehicle is moving slightly). For example, when a vehicle speed is V, the stopped state of the vehicle may include a state in a range of 0 km/h≤V≤5 km/h.

<Operation of PCU as Lock Control Unit>

The motorcycle includes a smart system 220 (vehicle electronic lock) which enables the vehicle to be locked and unlocked, the PCU 320 which is a lock control unit that controls the smart system 220, and the sub battery 327 which supplies electric power to the PCU 320.

The smart system 220 enables the vehicle to be locked and unlocked by authentication with a remote key 223 (portable device).

The smart system 220 includes the smart unit 221 connected to the PCU 320, an antenna 222 connected to the smart unit 221, a lock knob 211 (handle lock part) connected to the smart unit 221, and a seat switch 212 (lid lock part) connected to the smart unit 221.

The smart unit 221 is a control unit including a microcomputer.

The antenna 222 is a transmitting/receiving antenna for performing communication with the remote key 223.

The lock knob 211 enables the handle 2 (see FIG. 10) to be locked and unlocked.

The seat switch 212 enables the seat 8 (see FIG. 1) that is a storage lid for storing the battery 100 to be locked and unlocked.

The PCU 320 enables the vehicle to be unlocked with the battery 100 removed from the vehicle. The PCU 320 controls the smart unit 221 on the basis of an authentication result with the remote key 223.

As illustrated in FIG. 11, the lock knob 211 is disposed in the vicinity of the head pipe 12. The lock knob 211 is disposed in the switch holder 210. As illustrated in FIG. 12, the lock pin 214 that can be manually operated is provided inside the switch holder 210. The lock pin 214 is driven by an operation of the lock knob 211.

The downward extending piece 202d (engaging part) that engages with the lock pin 214 in a locked state of the handle 2 (see FIG. 10) is provided in the head pipe 12.

As illustrated in FIG. 20, the remote key 223 communicates with the smart unit 221 and transmits identification (ID) information. For example, the remote key 223 includes a transmitting/receiving circuit (not illustrated) to which a plurality of antennas for enabling omnidirectional communication (transmission and reception) are connected, an electrically erasable programmable read-only memory (EEPROM, not illustrated) as a storage device for storing data of various types, and a central processing unit (CPU) which controls components of the remote key 223. A power supply such as a lithium battery for driving the remote key 223 may be incorporated in the remote key 223.

For example, an authentication between the smart system 220 and the remote key 223 is performed by a push operation (ON) of the lock knob 211 when the remote key 223 is brought into an authentication area set in the vehicle in a state in which the transmitting/receiving circuit of the remote key 223 is active. The smart system 220 does not operate when the transmitting/receiving circuit of the remote key 223 is in a stopped state.

A lock that has restricted rotation of the lock knob 211 is released when the authentication between the smart system 220 and the remote key 223 is performed and then the solenoid 216 (see FIG. 12) operates, and thereby the lock knob 211 becomes rotatable. Locking of the handle 2 (see FIG. 10) can be performed by operating the lock knob 211. As illustrated in FIG. 11, when the lock knob 211 is turned counterclockwise, the lock pin 214 (see FIG. 12) is engaged with the downward extending piece 202d (see FIG. 12), and thereby the handle 2 (see FIG. 10) is brought into a locked state.

<Operations of Switches of Various Types or the Like>

Referring to FIG. 20, operations of switches of various types will be described.

For example, the smart unit 221 may be supplied with power from the sub battery 327 when the main switch 260 is turned on.

For example, when the main switch 260 and the start switch 228 are turned on, the sub battery 327 is charged by the main battery 100 through the DC-DC converter 326.

When the main switch 260 is ON, the smart unit 221 is supplied with power from the sub battery 327 regardless of presence or absence of the main battery 100. Therefore, the smart unit 221 can be operated by the sub battery 327 without the main battery 100.

When the main switch 260 is ON, the smart unit 221 is charged by the main battery 100 through the DC-DC converter 326.

The PCU 320 detects a state of a lid switch 213. The PCU 320 controls the vehicle on the basis of an open/closed state of the lid 240.

For example, when an open state of the lid 240 is detected before the vehicle travels, the PCU 320 performs control such that a driving force is not generated regardless of an input from the accelerator sensor 329.

Thereby, the vehicle can be prevented from starting to travel in a state in which the charging cord 245 (see FIG. 18) is not stored (in a state in which the lid 240 is open).

For example, when the open state of the lid 240 is detected while the vehicle is traveling, the PCU 320 may perform control of generating a driving force corresponding to the accelerator sensor 329 until a vehicle speed reaches substantially zero. For example, the vehicle speed can be obtained from the ABS 229 connected to the PCU 320.

The vehicle speed is not limited to being obtained from the ABS 229 and may be obtained from a global positioning system (GPS) or other devices for detecting a vehicle speed.

For example, when the vehicle speed reaches substantially zero or the vehicle is in a stopped state, the PCU 320 performs control such that a driving force is not generated regardless of an input from the accelerator sensor 329.

Accordingly, even when it is assumed that the lid 240 (see FIG. 18) is open during travel, the charging cord 245 (see FIG. 18) can be stored after the vehicle is moved to a safe location and stopped.

A notification device such as a light emitting diode (LED) indicator (not illustrated) that is changed according to an open/closed state of the lid 240 (see FIG. 18) may be provided in the meter 261. Due to the LED indicator that is visually recognized, the open/closed state of the lid 240 (see FIG. 18) can be ascertained even during travel.

As described above, in the above-described embodiment, the motorcycle 1 having the main battery 100 that can be attached to and detached from the vehicle body includes the smart system 220 which enables the vehicle to be locked and unlocked, the PCU 320 which controls the smart system 220, and the sub battery 327 which supplies electric power to the PCU 320, in which the PCU 320 enables the vehicle to be unlocked in a state in which the main battery 100 is removed from the vehicle.

According to the present embodiment, when the PCU 320 enables the vehicle to be unlocked in a state in which the main battery 100 is removed from the vehicle, the lock of the vehicle can be released. Therefore, even while the vehicle remains locked due to the smart system 220 in a state in which the main battery 100 is removed from the vehicle, the vehicle can be easily moved.

The smart system 220 enables the vehicle to be locked and unlocked by authentication with the remote key 223, the PCU 320 controls the smart system 220 on the basis of an authentication result with the remote key 223, and thereby the following effects are achieved. Even while the vehicle remains locked due to the smart system 220 in a state in which the main battery 100 is removed from the vehicle, the vehicle can be easily moved using the remote key 223.

Since the DC-DC converter 326 connecting the main battery 100 and the sub battery 327 is provided, the sub battery 327 is charged via the DC-DC converter 326 while the vehicle is traveling, and thereby the following effects are achieved. Since the sub battery 327 is charged while the vehicle is traveling, the smart system 220 can be prevented from becoming inoperable due to reduction in power of the sub battery 327.

Since the smart system 220 includes the lock knob 211 which enables the handle 2 to be locked and unlocked, the following effects are achieved. Even while the handle 2 remains locked due to the smart system 220 in a state in which the main battery 100 is removed from the vehicle, since the lock of the handle 2 can be released by the lock knob 211, the vehicle can be easily moved.

Since the lock knob 211 is disposed in the vicinity of the head pipe 12, the following effects are achieved. Since the lock knob 211 can be easily accessed compared to a case in which the lock knob 211 is disposed far away from the head pipe 12, the lock of the handle 2 can be easily released.

The lock knob 211 includes the lock pin 214 that can be manually operated, the downward extending part 202d that engages with the lock pin 214 in a locked state of the handle 2 is provided in the head pipe 12, and thereby the following effects are achieved. Since the engagement between the lock pin 214 and the downward extending part 202d can be manually released, the lock of the handle 2 can be easily released.

Since the smart system 220 includes the seat switch 212 that enables the seat 8 in which the main battery 100 is stored to be locked and unlocked, the following effects are achieved. Even while the seat 8 remains locked due to the smart system 220 in a state in which the main battery 100 is removed from the vehicle, since the lock of the seat 8 can be released by the seat switch 212, the main battery 100 can be easily stored.

In the above-described embodiment, an example in which the battery disposition structure includes two unit batteries has been described, but the present invention is not limited thereto. For example, the battery disposition structure may include one or three or more unit batteries.

In the above-described embodiment, an example of a cantilever structure in which only a left portion of the fender is fixed to the fender stay has been described, but the present invention is not limited thereto. For example, a cantilever structure in which only a right portion of the fender is fixed may be used. Alternatively, a double-lever structure in which both the left and right portions of the fender are fixed may be used.

The present invention is not limited to the above-described embodiment, and the saddled electric vehicles described above includes general vehicles on which a driver straddles the vehicle body to ride, including not only motorcycles (such as motorized bicycle and scooter type vehicle) but also three-wheeled vehicles (such as vehicles with two front wheel and one rear wheel as well as vehicles with one front wheel and two rear wheels) or four-wheeled vehicles.

The configuration in the above-described embodiment is an example of the present invention, and various changes can be made without departing from the scope of the present invention such as replacing the components of the embodiment with well-known components.

REFERENCE SIGNS LIST

1 Motorcycle (saddled electric vehicle)
2 Handle
8 Seat (storage lid)
12 Head pipe
100 Main battery (battery)
202d Downward extending piece (engaging part)
211 Lock knob (handle lock part)
212 Seat switch (lid lock part)
214 Lock pin
220 Smart system (vehicle electronic lock)
223 Remote key (portable device)
320 PCU (lock control unit)
326 DC-DC converter
327 Sub battery the invention claimed is:

1. A saddled electric vehicle comprising:
a vehicle body,
a handlebar,
a seat,
a main battery,
a vehicle electronic lock which enables the saddled electric vehicle to be locked and unlocked;
a lock control unit which controls the vehicle electronic lock; and
a sub battery which supplies electric power to the lock control unit, wherein
the lock control unit enables the vehicle to be unlocked in a state in which the main battery is removed from the saddled electric vehicle, and
the vehicle electronic lock includes a handlebar lock knob which enables the handlebar to be locked and unlocked, wherein
an operation of a battery lock mechanism and an insertion and removal of the main battery are manually performed, and
the main battery is attached to and detached from the vehicle body without tools,
the main battery is attachable to and detachable from the vehicle body with the seat open,
the main battery cannot be attached to or detached from the vehicle body with the seat closed,
when the seat is opened and closed, the main battery is switched between a state of being attachable and detachable and a state of not being attachable and detachable with respect to the vehicle body,
the main battery is a mobile battery that can be attached to and detached from the vehicle body,
the main battery can be charged by a charger outside the vehicle,
the vehicle electronic lock controls an operation of the handlebar lock knob which enables the handlebar to be locked and unlocked, even while the handlebar remains locked due to the vehicle electronic lock, in a state in which the main battery is removed from the saddled electric vehicle.

2. The saddled electric vehicle according to claim 1, wherein
the vehicle electronic lock enables the saddled electric vehicle to be locked and unlocked via authentication with a portable device, and
the lock control unit controls the vehicle electronic lock on the basis of an authentication result with the portable device.

3. The saddled electric vehicle according to claim 1, further comprising:
A DC-DC converter which connects the battery and the sub battery, wherein
the sub battery is charged via the DC-DC converter while the vehicle is traveling.

4. The saddled electric vehicle according to claim 1, wherein the handlebar lock knob is disposed in a vicinity of a head pipe.

5. The saddled electric vehicle according to claim 1, further comprising:
a lock pin which is manually operable, wherein
an engaging part that engages with the lock pin in a locked state of the handlebar is provided in a head pipe.

6. The saddled electric vehicle according to claim 1, wherein the vehicle electronic lock includes a lid lock part which enables a storage lid in which the battery is stored to be locked and unlocked.

* * * * *